United States Patent
Strimel et al.

(10) Patent No.: US 11,887,583 B1
(45) Date of Patent: Jan. 30, 2024

(54) UPDATING MODELS WITH TRAINED MODEL UPDATE OBJECTS

(71) Applicant: Amazon Technologies, Inc., Seattle, WA (US)

(72) Inventors: Grant Strimel, Presto, PA (US); Jonathan Jenner Macoskey, Pittsburgh, PA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 17/343,428

(22) Filed: Jun. 9, 2021

(51) Int. Cl.
  *G10L 15/06* (2013.01)
(52) U.S. Cl.
  CPC ................ *G10L 15/063* (2013.01)
(58) Field of Classification Search
  CPC ..... G10L 15/063; G10L 15/14; G10L 15/142; G10L 15/148; G10L 15/183
  See application file for complete search history.

(56) References Cited

U.S. PATENT DOCUMENTS

| | | | | |
|---|---|---|---|---|
| 5,963,902 | A * | 10/1999 | Wang | G06F 18/2321 704/256.2 |
| 10,726,830 | B1 * | 7/2020 | Mandal | G10L 15/16 |
| 2006/0031066 | A1 * | 2/2006 | Hetherington | G10L 21/0208 704/226 |
| 2008/0126094 | A1 * | 5/2008 | Janke | G10L 15/063 704/E15.046 |
| 2013/0096915 | A1 * | 4/2013 | Rennie | G10L 15/20 704/E15.039 |
| 2015/0019214 | A1 * | 1/2015 | Wang | G06N 3/02 704/232 |
| 2017/0148430 | A1 * | 5/2017 | Lee | G10L 15/16 |
| 2017/0286864 | A1 * | 10/2017 | Fiedel | G06N 20/00 |
| 2018/0322961 | A1 * | 11/2018 | Kim | G16H 40/67 |
| 2019/0220698 | A1 * | 7/2019 | Pradeep | G06T 7/75 |
| 2020/0175961 | A1 * | 6/2020 | Thomson | G10L 15/28 |

(Continued)

OTHER PUBLICATIONS

J. Li, et al, "Improving RNN transducer modeling for end-to-end speech recognition," ICASSP 2019—2019 IEEE International Conference on Acoustics, Speech and Signal Processing (ICASSP), 2019, pp. 114-121.

(Continued)

*Primary Examiner* — Michael Colucci
(74) *Attorney, Agent, or Firm* — Pierce Atwood LLP

(57) ABSTRACT

Some devices may perform processing using machine learning models trained at a centralized system and distributed to the device. The centralized system may update the machine learning model and distribute the update to the device (or devices). To reduce the size of an update, the centralized system may train a model update object, which may be smaller in size than the model itself and thus more suitable for sending to the device(s). A device may receive the model update object and use it to update the on-device machine learning model; for example, by changing some parameters of the model. Parameters left unchanged during the update may retain their previous value. Thus, using the model update object to update the on-device model may result in a more accurate updated model when compared to sending an updated model compressed to a size similar to that of the model update object.

20 Claims, 19 Drawing Sheets

(56) References Cited

U.S. PATENT DOCUMENTS

| | | | |
|---|---|---|---|
| 2022/0084510 A1* | 3/2022 | Peng | G06F 40/56 |
| 2022/0188837 A1* | 6/2022 | Assefa | G06N 5/01 |
| 2022/0350858 A1* | 11/2022 | Walia | G06F 16/9577 |

OTHER PUBLICATIONS

I. McGraw, et al., "Personalized speech recognition on mobile devices," 2016 IEEE International Conference on Acoustics, Speech and Signal Processing (ICASSP), 2016, pp. 5955-5959.

T. N. Sainath, et al., "A streaming on-device end-to-end model surpassing server-side conventional model quality and latency,", ICASSP 2020—2020 IEEE International Conference on Acoustics, Speech and Signal Processing (ICASSP), 2020, pp. 6059-6063.

Y. He, et al., "Streaming end-to-end speech recognition for mobile devices," ICASSP 2019—2019 IEEE International Conference on Acoustics, Speech and Signal Processing (ICASSP), 2019, pp. 6381-6385.

Y. Shangguan, et al., "Optimizing speech recognition for the edge," 2019, [https://arxiv.org/abs/1909.12408], 11 pages.

J. Macoskey, et al., "Bifocal neural asr: exploiting keyword spotting for inference optimization," IEEE International Conference on Acoustics, Speech and Signal Processing (ICASSP), Jun. 2021, [https://www.amazon.science/publications/bifocal-neural-asr-exploiting-keyword-spotting-for-inference-optimization], 5 pages.

R. Pang, et al., "Compression of end-to-end models," Proceedings of the Annual Conference of the International Speech Communication Association (Interspeech 2018), Hyderabad, India, 2018, pp. 27-31.

A. Graves, "Sequence transduction with recurrent neural networks," International Conference of Machine Learning (ICML) 2012 Workshop on Representation Learning, 2012, 9 pages.

A. Graves, et al., "Towards end-to-end speech recognition with recurrent neural networks," Proceedings of the 31st International Conference on Machine Learning (ICML), Beijing, China, 2014, JMLR: W&CP vol. 32, 9 pages.

W. Chan, et al., "Listen, attend and spell," 2016 IEEE International Conference on Acoustics, Speech and Signal Processing (ICASSP), 2015, [https://arxiv.org/abs/1508.01211], 16 pages.

Q. Zhang, et al., "Transformer transducer: a streamable speech recognition model with transformer encoders and RNN-T loss," IEEE International Conference on Acoustics, Speech and Signal Processing (ICASSP), 2020, pp. 7829-7833.

M. Radfar, et al., "End-to-end neural transformer based spoken language understanding," Proceedings of the Annual Conference of the International Speech Communication Association (Interspeech 2020), Shanghai, China, 2020, pp. 866-970.

A. Narayanan, et al., "Recognizing long-form speech using streaming end-to-end models," 2019 IEEE Automatic Speech Recognition and Understanding Workshop (ASRU), 2019, 8 pages.

G. P. Strimel, et al., "Statistical model compression for small-footprint natural language under-standing," Proceedings of the Annual Conference of the International Speech Communication Association (Interspeech 2018), Hyderabad, India, 2018, pp. 866-870.

K. M. Sathyendra, et al., "Extreme model compression for on-device natural language understanding," Proceedings of the 28th International Conference on Computational Linguistics: Industry Track, Barcelona, Spain (Online), 2020, pp. 160-171.

F. Seide, et al., "1-bit stochastic gradient descent and its application to data-parallel distributed training of speech DNNs," Proceedings of the Annual Conference of the International Speech Communication Association (Interspeech 2014), Singapore, 2014, pp. 1058-1062.

N. Strom, "Scalable distributed DNN training using commodity GPU cloud computing," Proceedings of the Annual Conference of the International Speech Communication Association (Interspeech 2015), Dresden, Germany, 2015, pp. 1488-1492.

D. Alistarh, et al., "QSGD: communication-efficient SGD via gradient quantization and encoding, 31st Conference on Neural Information Processing Systems (NIPS)." In Advances in Neural Information Processing Systems 30 (NIPS), 2017, 12 pages.

L. Yujun, et al., "Deep gradient compression: reducing the communication bandwidth for distributed training," Proceedings of the International Conference on Learning Representations (ICLR), 2018, 14 pages.

R. Spring, et al., "Compressing gradient optimizers via count-sketches," Proceedings of the 36th International Conference on Machine Learning (ICML), 2019, pp. 5946-5955.

M. D. Lange, et al., "Continual learning survey: a comparative study on how to defy forgetting in classification tasks," [https://homes.esat.kuleuven.be/~konijn/publications/2019/1909.08383.pdf], 2019, 23 pages.

S. Sadhu, et al., "Continual learning in automatic speech recognition," Proceedings of the Annual Conference of the International Speech Communication Association (Interspeech 2020), Shanghai, China, 2020, pp. 1246-1250.

H. B. Mcmahan, et al., "Communication-efficient learning of deep networks from decentralized data," Proceedings of the 20th International Conference on Artificial Intelligence and Statistics (AISTATS), 2017, JMLR: W&CP vol. 54, pp. 1273-1282.

D. Dimitriadis, et al., "A federated approach in training acoustic mod-els," Proceedings of the Annual Conference of the International Speech Communication Association (Interspeech 2020), Shanghai, China, 2020, pp. 981-985.

Z. Li, et al., "Learning without forgetting," Published in: IEEE Transactions on Pattern Analysis and Machine Intelligence, vol. 40, Issue 12, Dec. 1, 2018, pp. 2935-2947.

M. Farajtabar, et al., "Orthogonal gradient descent for continual learning," Proceedings of the 23rd International Conference on Artificial Intelligence and Statistics (AISTATS), 2020, PMLR: vol. 108, pp. 3762-3773.

P. Kairouz, et al., "Advances and open problems in federated learning," 2019, [https://arxiv.org/abs/1912.04977v1], 105 pages.

B. Liu, et al., "Sparse convolutional neural networks," Proceedings of the IEEE Conference on Computer Vision and Pattern Recognition (CVPR), 2015, pp. 806-814.

C. Louizos, et al., "Learning sparse neural networks through L0 regularization," Proceedings of the International Conference on Learning Representations (ICLR), (conference paper), 2018, pp. 1389-1397.

M. H. Zhu, et al., "To prune, or not to prune: exploring the efficacy of pruning for model compression," Proceedings of the International Conference on Learning Representations (ICLR) Workshop, 2018, 10 pages.

K. Zhen, et al., "Sparsification via compressed sensing for automatic speech recognition," IEEE International Conference on Acoustics, Speech and Signal Processing (ICASSP), 2021.[Online] [https://arxiv.org/abs/2102.04932], 5 pages.

W. Chen, et al., "Compressing neural networks with the hashing trick," Proceedings of the International Conference on Machine Learning (ICML), pp. 2285-2294, 2015. [Online] [https://arxiv.org/abs/1504.04788], 10 pages.

Q. Shi, et al., "Hash kernels for structured data," Journal of Machine Learning Research, 2009, vol. 10. pp. 2615-2637.

V. Panayotov, et al., "Librispeech: An ASR corpus based on public domain audio books," IEEE International Conference on Acoustics, Speech and Signal Processing (ICASSP), 2015, pp. 5206-5210.

L. Lugosch, et al., "Speech model pre-training for end-to-end spoken language understanding," Proceedings of the Annual Conference of the International Speech Communication Association (Interspeech 2019), Graz, Austria, 2019, pp. 814-818.

B. Agrawal, et al., "Tie your embeddings down: cross-modal la-tent spaces for end-to-end spoken language understanding," [https://arxiv.org/abs/2011.09044], 2020, 7 pages.

A. Hermans, et al., "In defense of the triplet loss for person re-identification," [https://arxiv.org/abs/1703.07737], 2017, 15 pages.

* cited by examiner

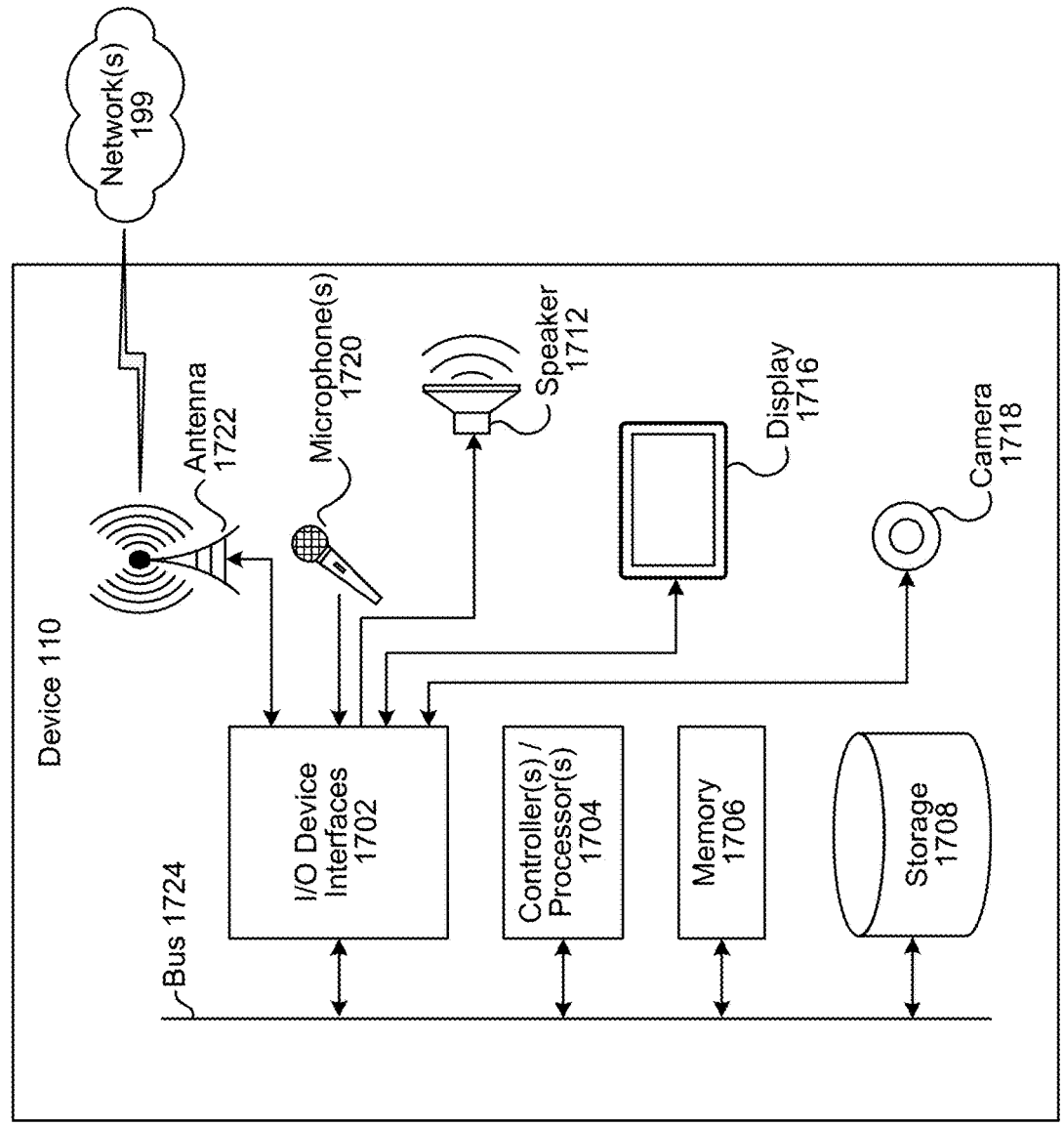

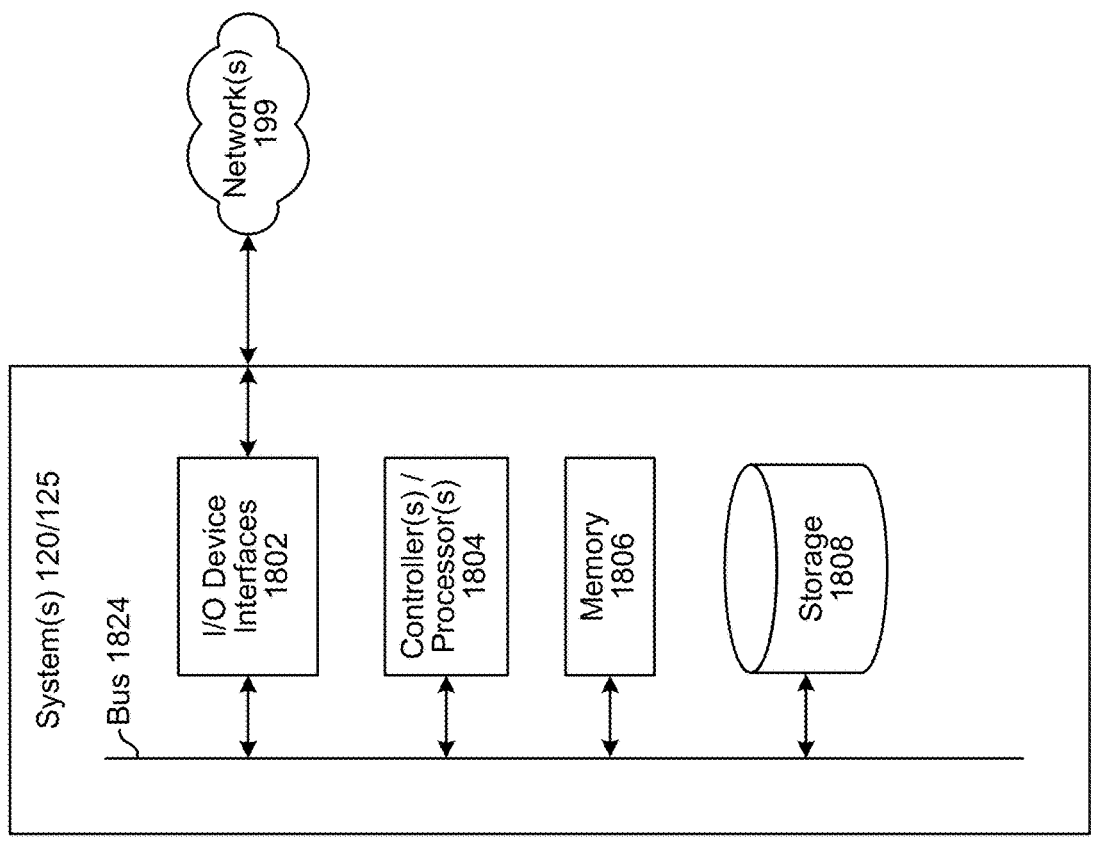

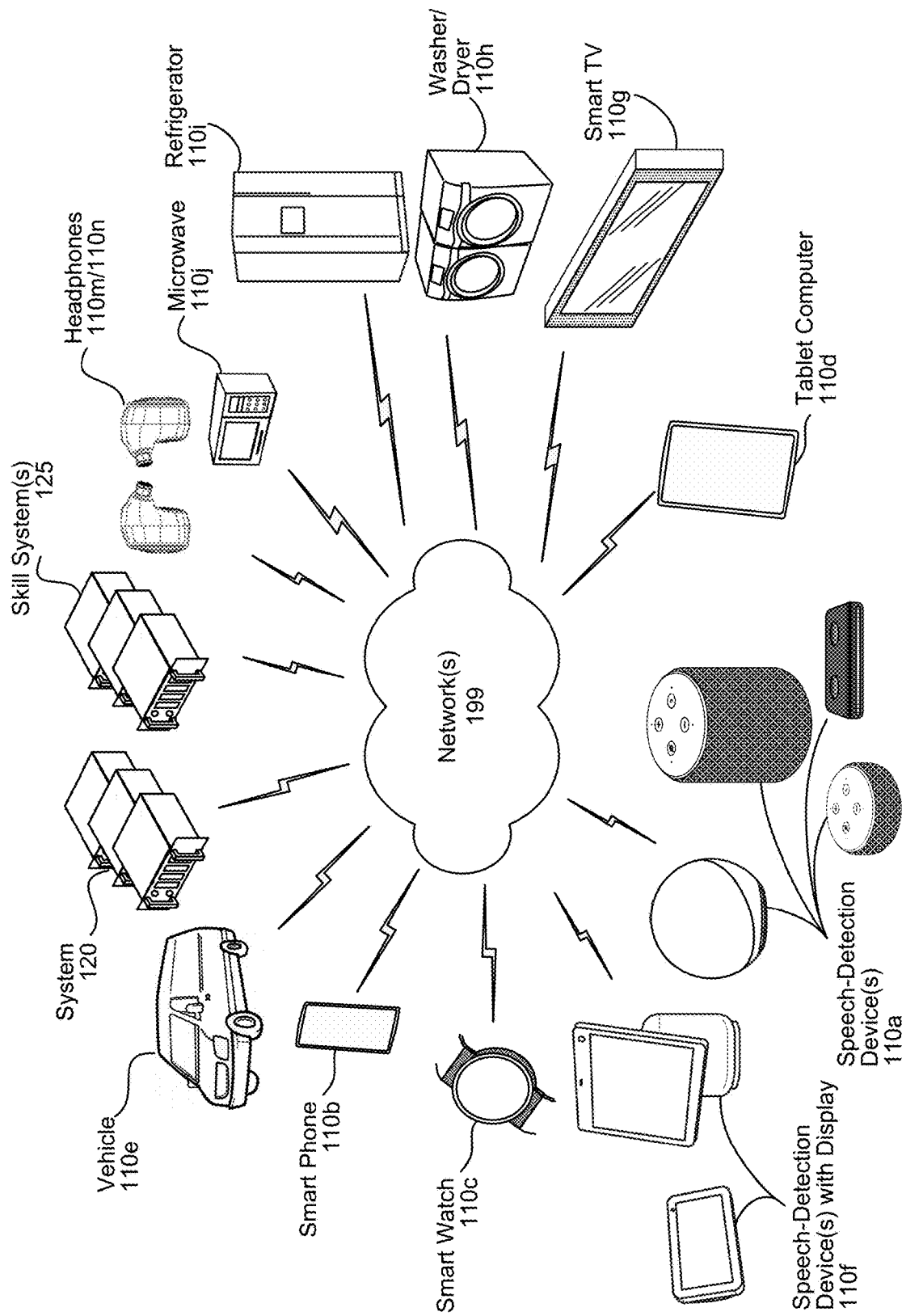

UPDATING MODELS WITH TRAINED MODEL UPDATE OBJECTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 17 is a block diagram conceptually illustrating example components of a device, according to embodiments of the present disclosure.

FIG. 18 is a block diagram conceptually illustrating example components of a system, according to embodiments of the present disclosure.

FIG. 19 illustrates an example of a computer network for use with the overall system, according to embodiments of the present disclosure.

DETAILED DESCRIPTION

Figure 1:
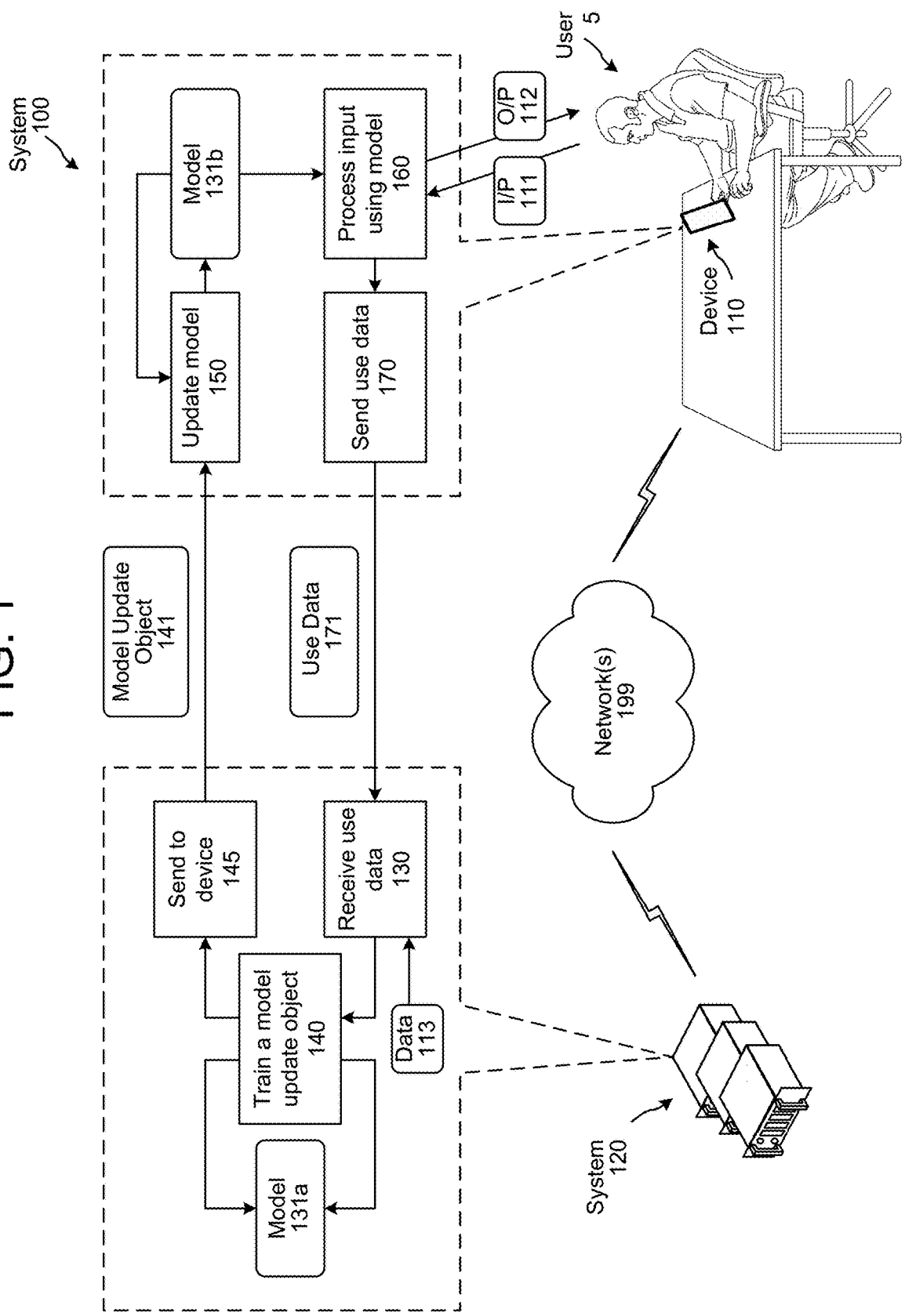
FIG. 1 is a conceptual diagram illustrating example operations of a system for training a model update object and updating a model on a user device, according to embodiments of the present disclosure.

Computer systems may employ machine learning algorithms to perform tasks that may involve recognizing patterns and/or sequences in data and making inferences and/or predictions. Examples of machine learning algorithms include linear regression, logistic regression, artificial neural networks, decision tress, naïve Bayes, random forest, and others. Machine learning algorithms may process training data to build a model. A machine learning model may have many parameters (e.g., weights) trained using various techniques such as supervised learning, unsupervised learning, and/or reinforcement learning. Machine learning models have many applications including but not limited to: computer vision, fingerprint/facial recognition, object recognition, acoustic event detection, simultaneous localization and mapping, automatic speech recognition (ASR), natural language understanding (NLU), natural language generation (NLG), text-to-speech (TTS), and others.

As a machine learning model is trained, the number of weights in the model may grow in number and/or precision; accordingly, the model may grow in size. Models may vary in size from several kilobytes to many gigabytes or more depending on the application and/or training data. In some cases, machine learning models may be employed in centralized systems. In some applications, however, some or all processing using machine learning models may be performed on systems or devices separate from the centralized system. For example, a mobile phone may use a machine learning model for speech processing and/or face recognition, a car may use a machine learning model for self-driving capabilities, etc. Such models may be updated periodically, perhaps using a wireless data network (e.g., an over the air or "OTA" model update) to distribute the update to one or many other devices/systems. A model update may, however, involve a large data transfer to the device/system. Further-more, the data transfer may be multiplied by the number of devices/systems receiving the update.

Offered is a system, method, and other new technology to improve the updating of existing on-device models; for example, machine learning models that may reside on many different user devices. This disclosure describes techniques for updating on-device machine learning models using a trained model update object, which may be much smaller than the model itself, and thus more suitable for OTA updates to user devices. The model update object may be created at a centralized system and transmitted to the user device. Software on the user device may update the previous-generation model using the model update object to create the next-generation model. The user device may receive the model update object and update the model offline (e.g., when the device is not in use so as to not interfere with the user's activities). Because updating the model using the model update object reuses the information of the previous-generation model, the model update object can be compressed to a higher degree than the model itself without a suffering similar reduction in accuracy. In some cases, an OTA update budget (e.g., a data size) for the model update object can be preset, and the model update object can be learned to maximize accuracy of the resulting updated model with respect to the new dataset, while keeping the model update object at or within the OTA update budget. While this disclosure describes model update object for updating models in the context of speech processing, the systems and methods herein may be used to update various types of machine learning models as applied to different types of data including image data (e.g., fingerprint and/or facial recognition), financial data, sensor data, game play, self-driving vehicle control, etc.

A model update object may be learned and used to update a model in various ways. In a first approach, a sparse matrix approach may involve iterative pruning of low-magnitude weights (e.g., by replacing the weights with a null value) during training using a sparse mask until a target sparsity and/or a target size for the model update object is reached. When the model is updated using the sparse matrix model update object, the model may remain fully dense because any weights not updated by the model update object may simply carry forward the previous generation's value. Because the model remains fully dense, highly sparse model update may be used without the degradation of performance that may result from increasing the sparsity of the model itself. In a second approach, a hashed model update object, where the hashed model update object has a predetermined size, can be trained using one or more predetermined functions to randomly hash values of the model update object into weights in an array or matrix. The predetermined functions may be reseeded or otherwise changed at each generation (e.g., each model update) to prevent the same weight positions from colliding in successive updates. In a third approach, the model update object may include input-output pairs that may be used to retrain the model on the device; for example, by calculating gradients. The input-output pairs may not be from the updated dataset itself, but rather may be synthetic input-output pairs trained based on processing the previous-generation model and the updated dataset.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating example operations of a system 100 training a model update object and updating a model on a user device, according to embodiments of the present disclosure. As shown in FIG. 1, the virtual assistant system 100 may include a voice-enabled device 110 local to a user 5, a centralized system 120 (abbreviated "system 120"), and one or more skill support systems 125 (shown in FIG. 12) connected across one or more networks 199. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5. The device 110 may process audio following detection of a wakeword. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data 1213 corresponding to a natural language input originating from the user 5, and send the text data to the system 120. The device 110 may also receive output data from the system 120, and generate a synthesized speech output. The device 110 may include a camera for capturing image and/or video data for processing by the system 120. Examples of various devices 110 are further illustrated in FIG. 19. The system 120 may be centralized system such as a group of computing components located geographically remote from device 110 but accessible via network 199 (for example, servers accessible via the internet). The system 100 may also include a system and/or second device that is physically separate from device 110 but located geographically close to device 110 and accessible via network 199 (for example a home server located in a same residence as device 110. System 100 may also include some combination thereof, for example where certain components/operations are performed via a home server(s) and others are performed via a geographically remote centralized system 120.

In some systems 100, certain speech processing functions may be performed on the device 110; for example, at a stage 160 and using the language processing components 292 described below with reference to FIG. 12. Language processing may leverage one or more models 131 for ASR and/or NLU. The model 131 may include artificial neural networks of various architectures such as Hybrid Deep Neural Network-Hidden Markov Models (DNN-HMM), recurrent neural network transducers (RNN-T), convolutional neural networks (CNN), transformers, conformers, etc. The model 131 may include learned parameters such as model weights. The system 100 may refine the model 131 based on user interactions with the system 100; for example, input data 111 from the user 5, output data 112 to the user, and/or other data 113 from other users and/or other data sources. The system 100 may update the on-device model 131*b* by providing new weights. While neural networks are used as an example, the techniques described herein may apply to any machine learning model or data structure having many parameters that may change or be changed over time.

Language processing models may grow large and present challenges for OTA updates to mobile devices such as the device 110, which may be subject to data caps and/or other bandwidth constraints. Compressing the model to reduce the size of the OTA update may reduce the model's accuracy. Thus, rather than updating an on-device model 131b by transmitting the entire updated model 131a to the device 110, the system 120 may train the model update object 141, which may be used to modify the previous generation model 131 to generate the updated model 131 (or an approximation of the updated model 131). Because any weights of the model 131 not updated by the model update object 141 may carry forward their previous values, the model update object 141 may be compressed to a much greater extent than the model 131 itself without suffering a similar reduction in accuracy.

The operations of system 100 as shown in FIG. 1 assume that the system 120 and/or the device 110 include a trained model 131a and/or 131b (collectively "trained\model 131"). The trained model 131 can include, for example and without limitation, one or more of a wakeword detection model, an acoustic event detection (AED) model (e.g., for detecting a sound of broken glass, a baby crying, a smoke alarm, a doorbell, etc.), an ASR acoustic and/or language model, an NLU model, an SLU model (e.g., a combined ASR and NLU model that processes audio to determine executable data including intent and/or entity data), an object and/or face detection model, and/or a sentiment detection model, etc.

The operations of system 100 may begin by receiving, at a stage 130, usage data representing interactions between the user 5 and the system 100. The interactions may include user input data 111 and/or system output data 112. The usage data may additionally or alternatively include other data 113 that may represent interactions with other users 5 of the system 100. In some implementations, the training dataset may include curated and/or annotated data. At a stage 140, the system 100 may train the model update object 141 using the usage data and the previous-generation model 131a. The training at the stage 140 may include, for example and without limitation, updating a wakeword detection model to add/remove wakewords and/or associate wakewords with different speech processing systems, updating an ASR model to add/remove acoustic events, add/remove words to/from an ASR model, updating an SLU and/or an NLU model to add/remove intents and/or entities, updating an image recognition model to recognize new objects/faces, adjusting probabilities associated with different detected wakewords, events, words, intents, entities, sentiments, objects, faces, etc., and/or generally adjust weights corresponding to different layers and/or nodes of the model 131. In some implementations, the dataset used to for training the model update object 141 may include contents of a dataset used to train previous-generation models 131.

In some implementations, the system 120 may train the model update object 141 based on a predetermined size constraint; for example, an OTA update budget. For example, in training the model update object 141, the system 120 may determine the size constraint for the desired model update object 141, such as a data size of the model update object 141 (e.g., 1, 10, 100 MB, etc.), number of values (e.g., 100k, 1M, 10M values, etc.), and/or a target sparsity of a weight matrix or vector (e.g., 50%, 80%, 95%, etc.). A model update object 141 trained based on the target characteristic may result in a better performing updated model 131 relative to a model update object 141 that is compressed to meet the target characteristic after training.

Figure 5:
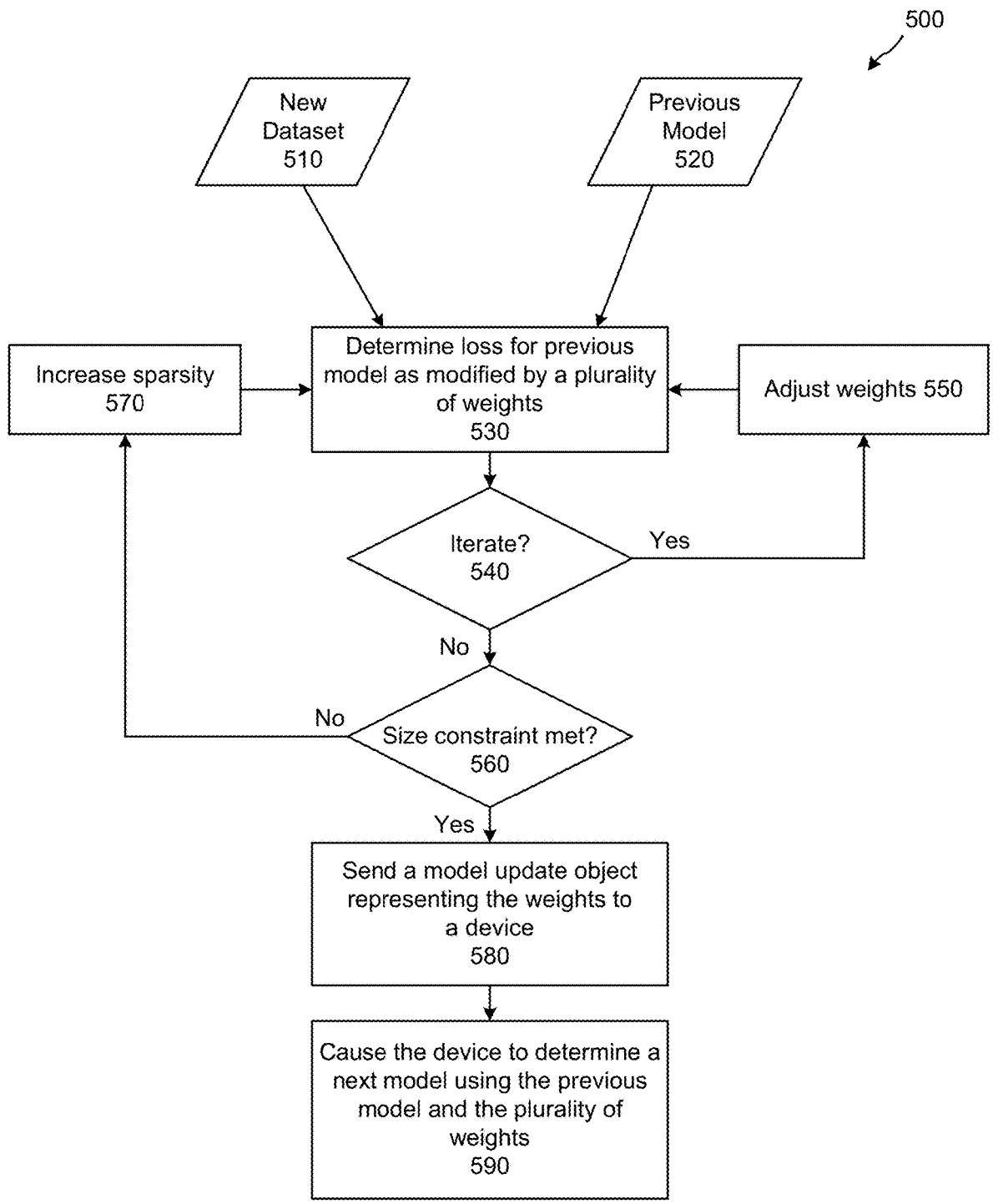
FIG. 5 is a flowchart describing example operations of a method of training a model update object and using it to update an on-device model, according to embodiments of the present disclosure.
Figure 6:
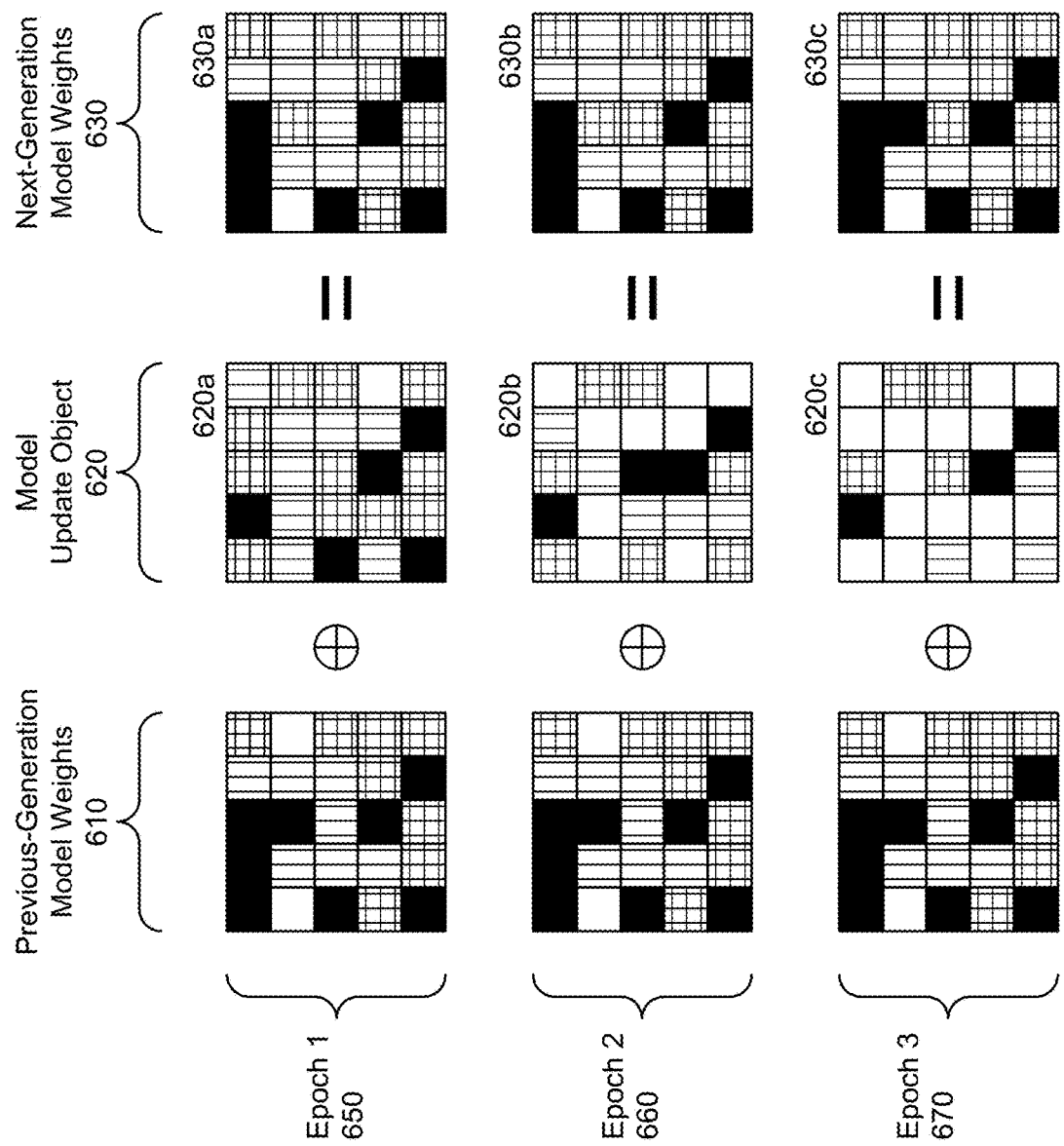
FIG. 6 is a conceptual diagrams that illustrates training a sparse matrix model update object and using it to update model weights, according to embodiments of the present disclosure.
Figure 7:
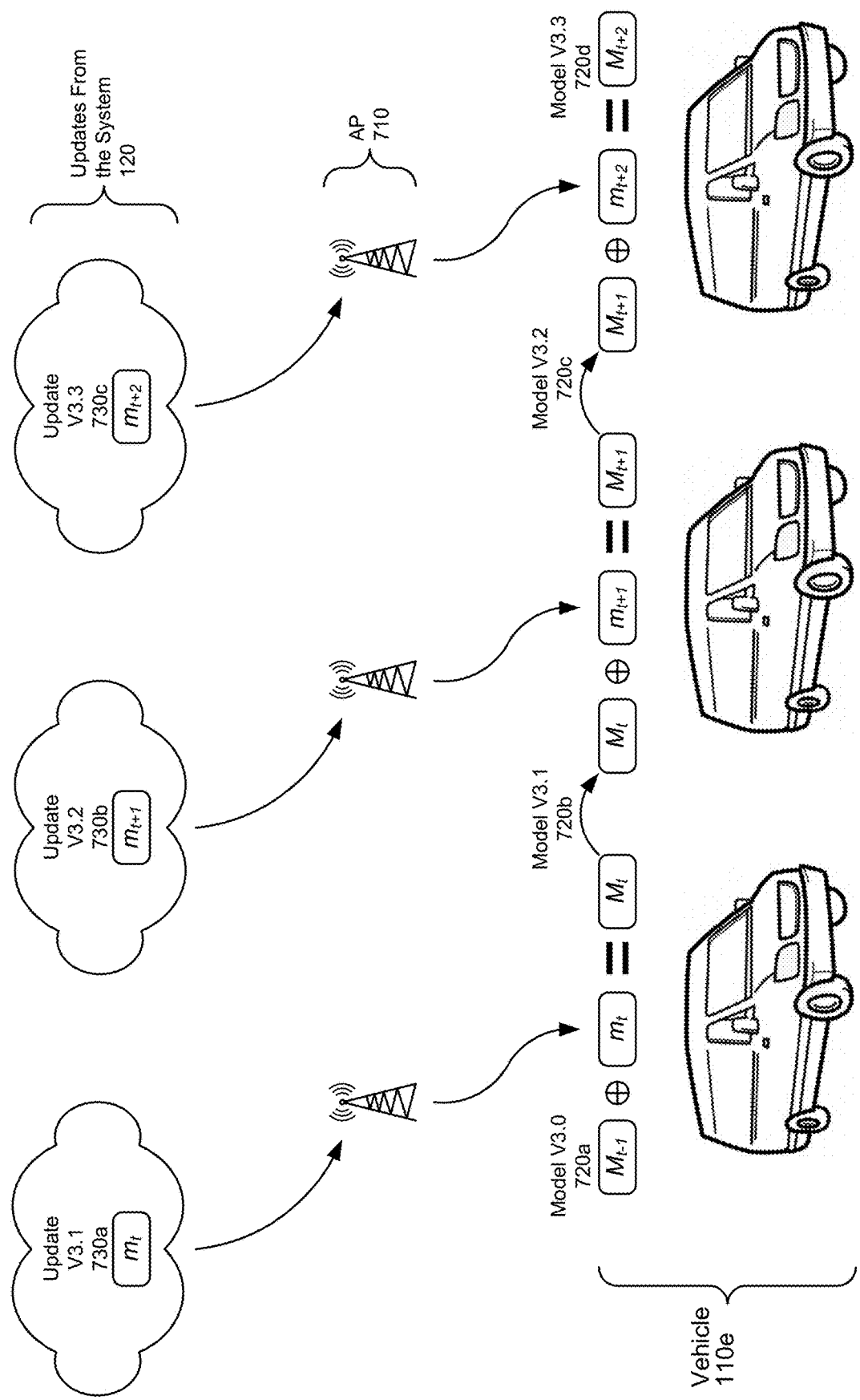
FIG. 7 is a conceptual diagram illustrating successive updates to an on-device model using the sparse matrix model update object, according to embodiments of the present disclosure.
Figure 8:
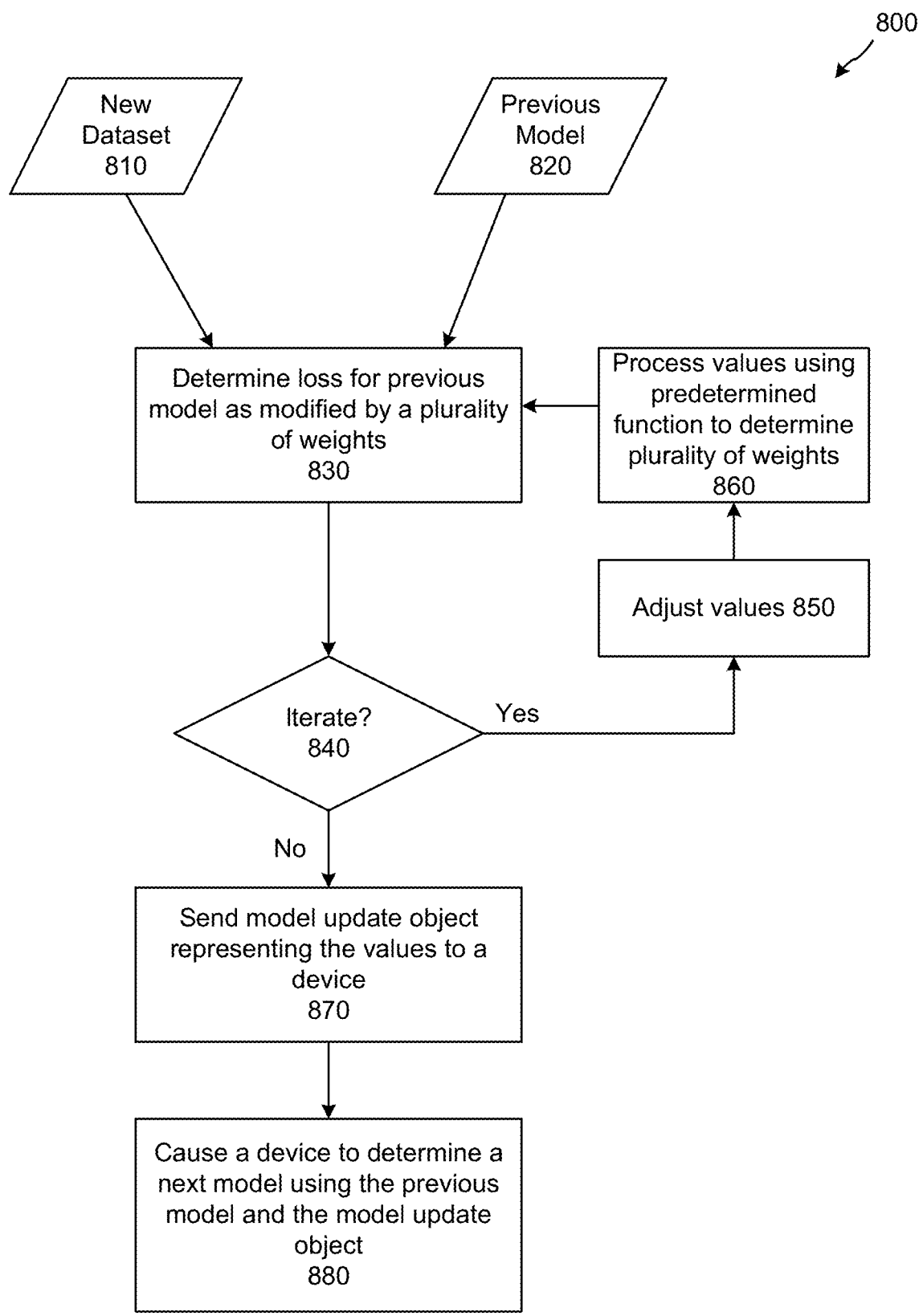
FIG. 8 is a flowchart describing example operations of a method of training a model update object in the form of a hashed representation of weights, and using it to update an on-device model, according to embodiments of the present disclosure.
Figure 9:
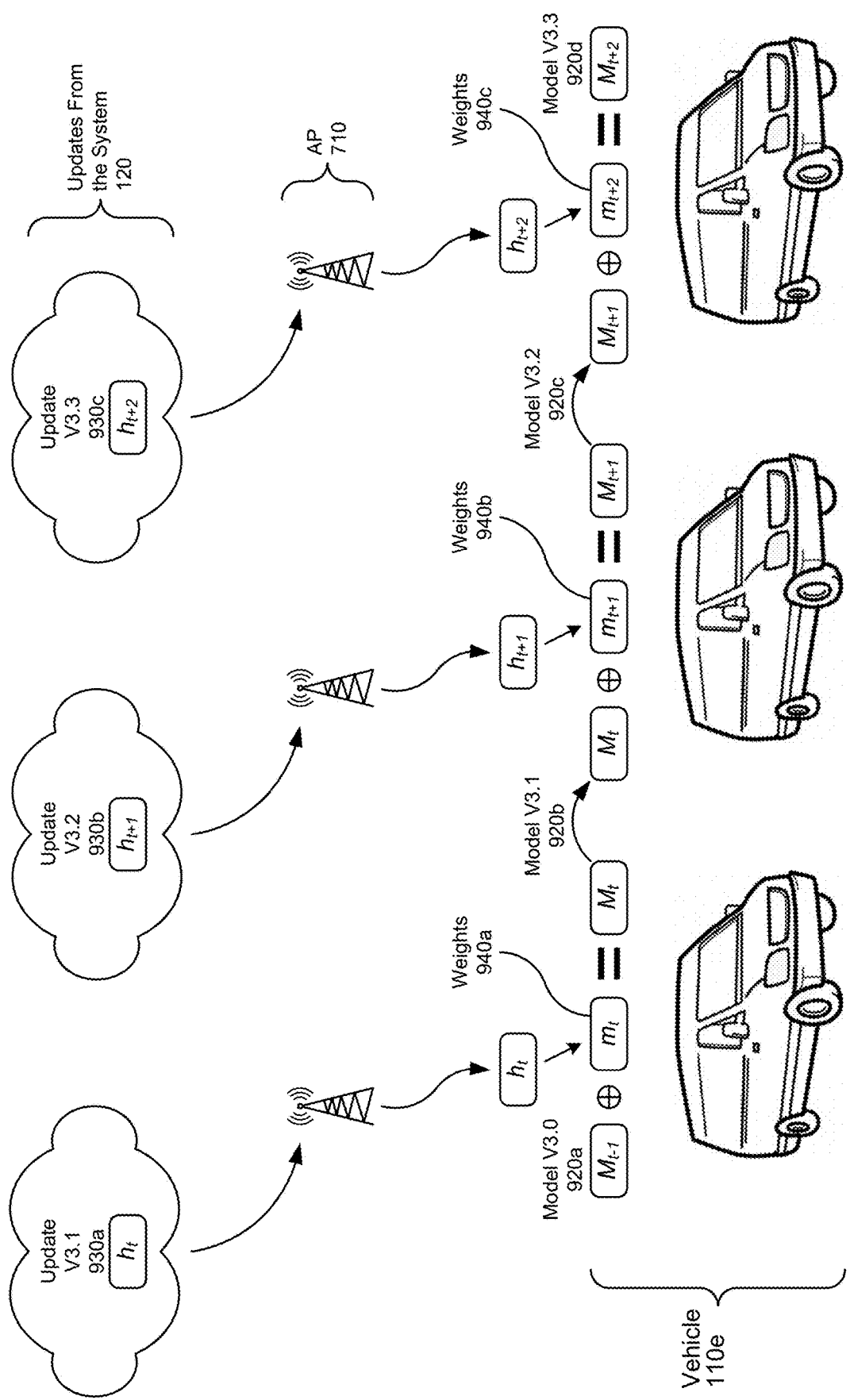
FIG. 9 is a conceptual diagram illustrating successive updates to an on-device model using the hashed representation of the model update object, according to embodiments of the present disclosure.
Figure 10:
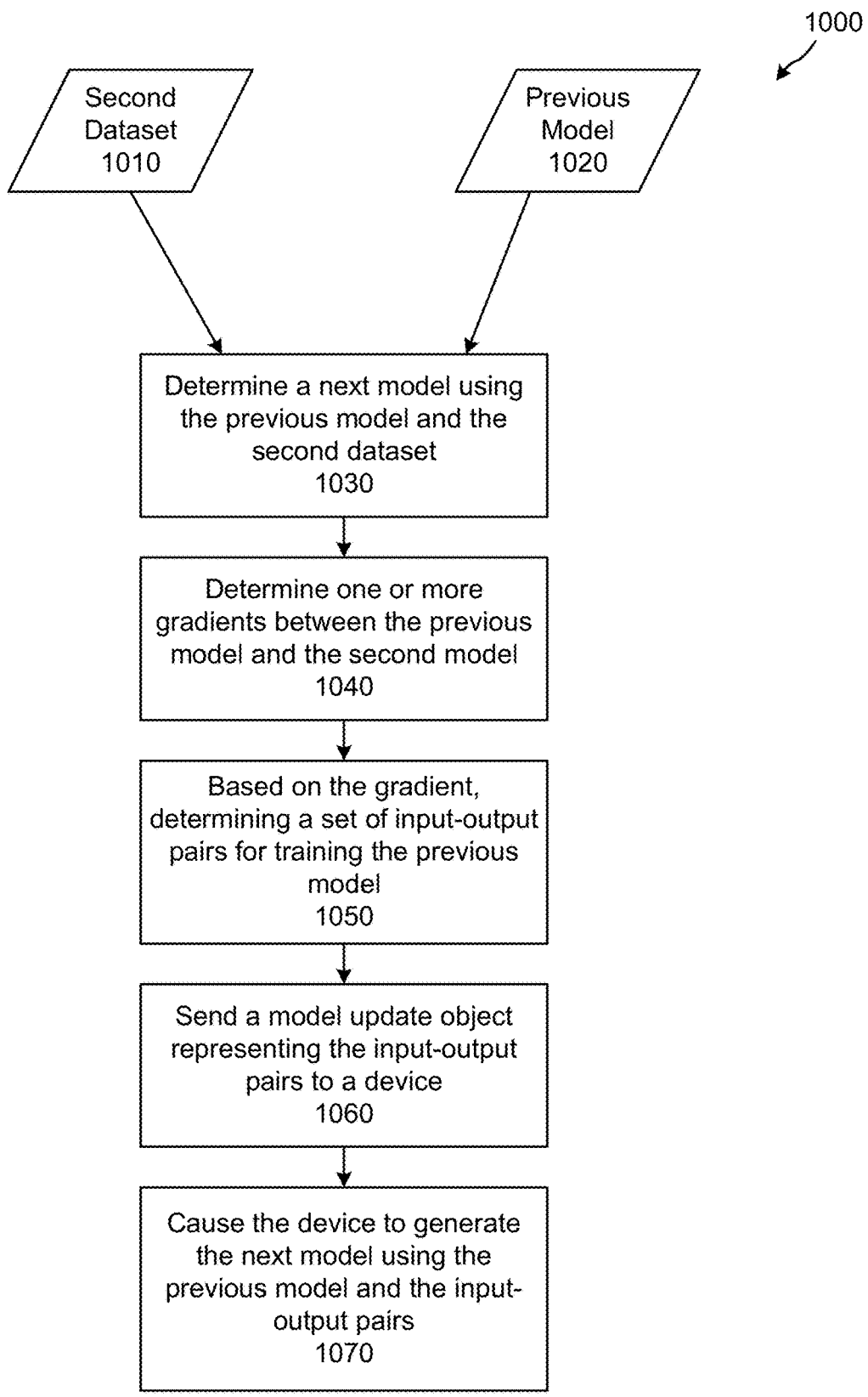
FIG. 10 is a flowchart describing example operations of a method of training a set of input-output pairs and using it to update an on-device model, according to embodiments of the present disclosure.
Figure 11:
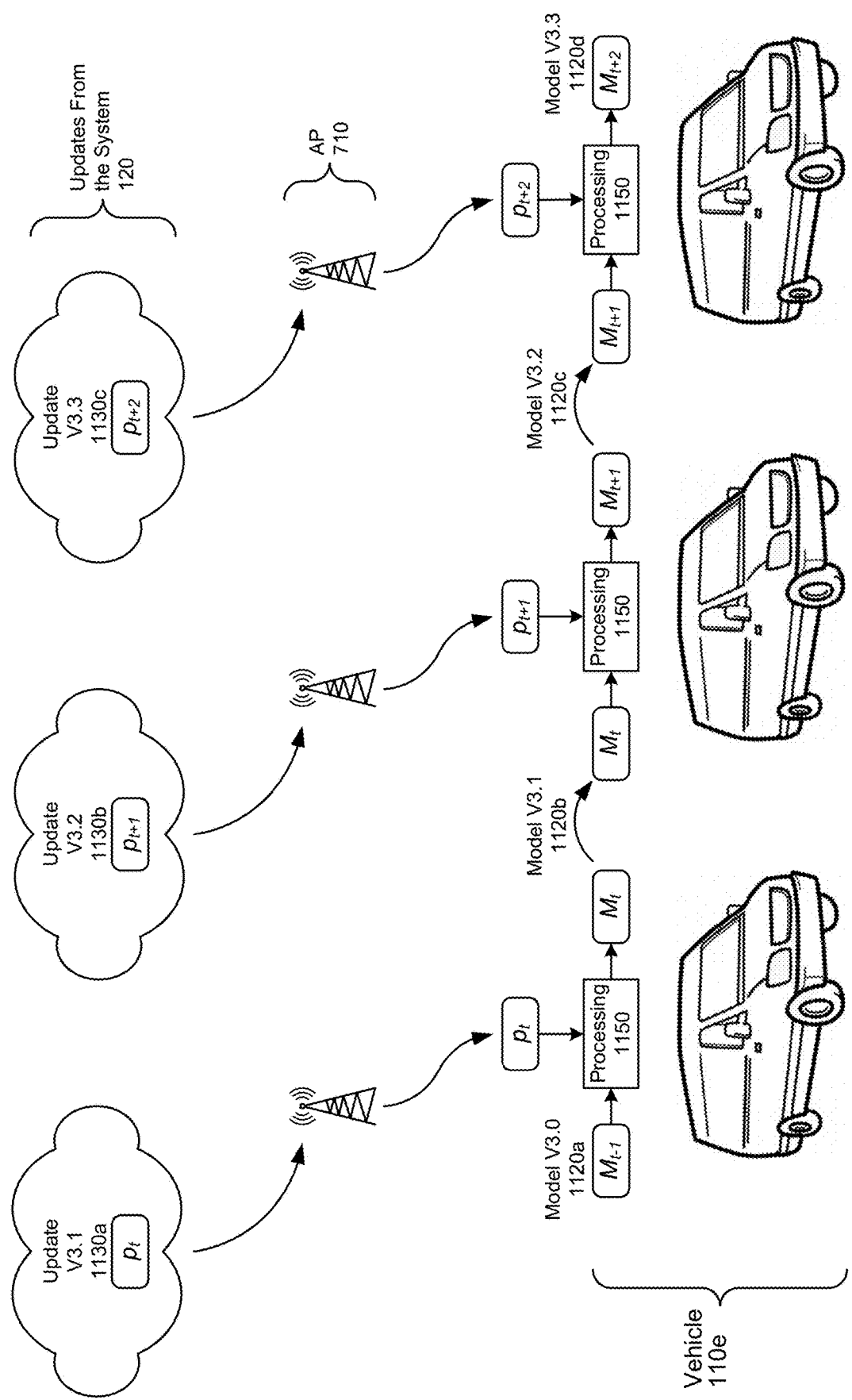
FIG. 11 is a conceptual diagram illustrating successive updates to an on-device model using a model update object comprising input-output pairs, according to embodiments of the present disclosure.

The model update object 141 may take various forms; for example, a sparse matrix, a hashed representation, and/or synthetic input-output pairs, etc. FIGS. 5 through 7 describe an example of training a model update object 141 in the form of a sparse matrix and using it to update an on-device model 131. FIGS. 8 and 9 describe an example of training a hashed model update object 141 and using it to update an on-device model 131. FIGS. 10 and 11 describe an example of training a model update object 141 in the form of synthetic input-output pairs and using it to update an on-device model 131b. The enumerated types of model update objects 141 are illustrated herein as examples and not intended to limit the scope of this disclosure. In some implementations, the various techniques may be modified and/or combined with each other and/or other manners of training and/or compression. Although the systems and methods described herein relate to model update objects for updating speech processing models, they may be used to update various types of computer models used for various applications including image processing, sensor data processing, financial data processing, machine or self-driving vehicle control, etc.

At a stage 145, the system 120 may send the model update object 141 to the device 110. The device 110 may receive the model update object 141 and, at a stage 150, use the model update object 141 and the previous model 131b to generate an updated model 131b. For example, the model 131b may include a plurality of weights. The device 110 may execute an algorithm to update values of the weights using the model update object 141. The device 110 may update weights of the model 131b using various mathematical functions including vector addition and/or multiplication, matrix addition and/or multiplication, and or one or more predetermined (e.g., hash) functions, as described in further detail with reference to FIG. 2 and FIGS. 5 through 11.

At a stage 160, the device 110 may process input data 111 from the user 5 using the updated model 131b. The input data 111 may include spoken and/or written natural language input, as well as other forms of input such as images and/or other tactile or sensor input such as a button press. The device 110 may provide output data 112 to the user 5 based on processing of the input data 111. The output data 112 may include synthesized speech responsive to the input data 111 and/or performance of one or more actions responsive to the input data 111.

At a stage 170, the device 110 may send use data 171 to the system 120 for use in refining the model 131. The operations of the system 100 may repeat with the system 120 once again receiving, at the stage 130, the use data 171. The system 120 may train, at the stage 140, a new model update object 141 based on the newly received use data 171 and other data 113. The new model update object 141 may be based on the previously determined model 131a, and may be used to determine the updated model 131a and/or 131b.

Figure 2:
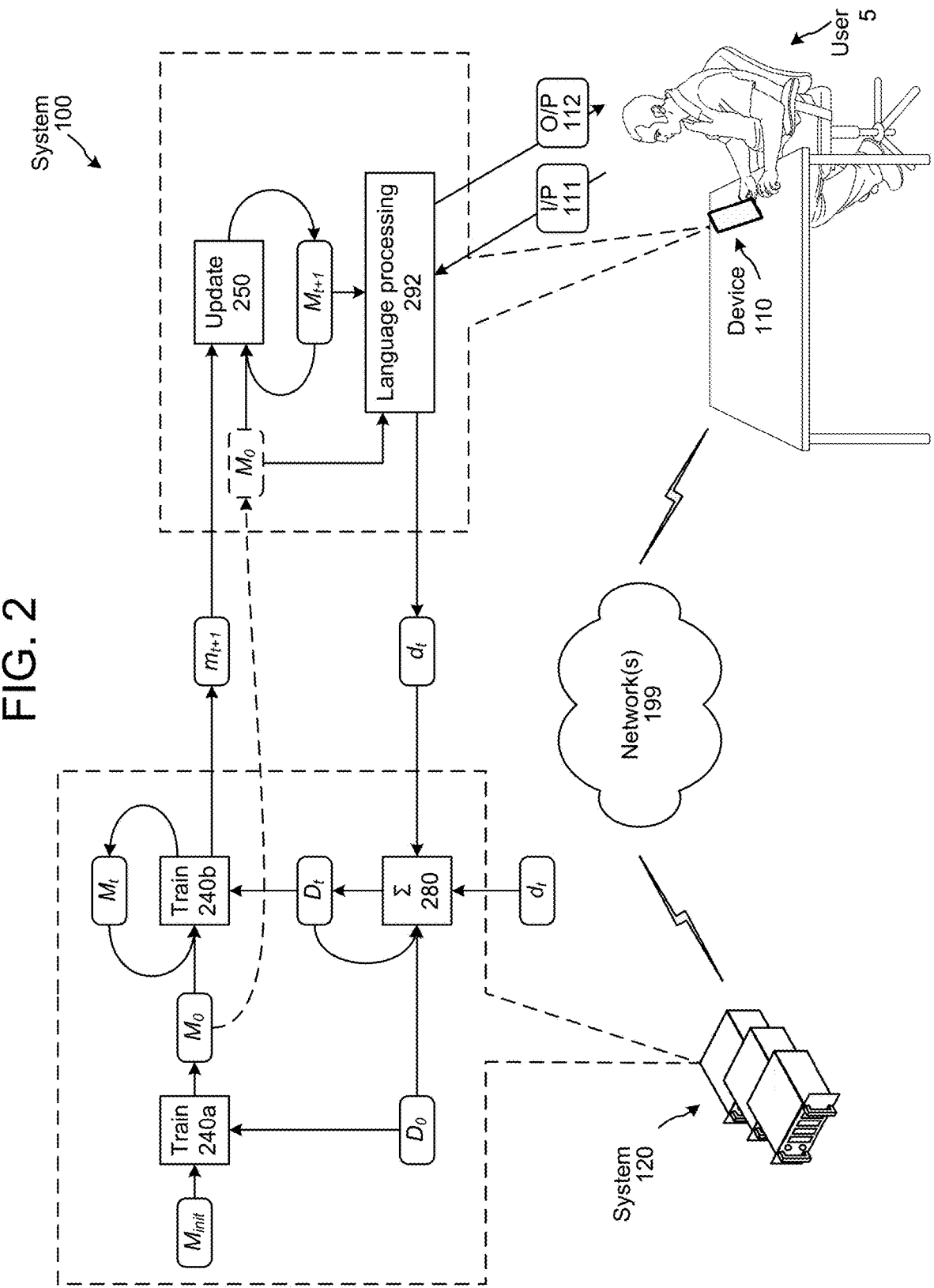
FIG. 2 is a conceptual diagram illustrating a high level overview of example components of the system, according to embodiments of the present disclosure

FIG. 2 is a conceptual diagram illustrating a high level overview of example components of the system 100, according to embodiments of the present disclosure. The system may include one or more training components 240a and 240b (collectively, "training component 240"). The system 100 may train a first-generation model $M_0$ using the training component 240a. The training component 240a may take as inputs a first dataset $D_0$ and an initial model $M_{init}$, which may be populated, for example, with random weights. The training component 240a may output the first-generation model $M_0$, which the system 120 may provide to the device 110, for example, via the network 199, or as a feature of the device 110 pre-installed by a manufacturer, distributor, or retailer of the device 110. Subsequent generations of the model (e.g., $M_1$, $M_2$, etc.) may be trained using the training component 240b; however the training components 240a and 240b need not be separate components, but are shown separately in FIG. 2 for clarity in illustrating operations for training the first-generation model versus training a model update object for subsequent generations of the model. In various implementations, successive generations of the model M may be trained by the same or separate training components 240 and/or systems 120.

Following deployment of the first-generation model $M_0$, the device 110 may process input data 111 using language processing components 292 (described further below with reference to FIG. 12), which may leverage the first-generation model $M_0$ (and/or other components of the device 110 and/or system 120) and return output data 112. The device 110 may provide the system 120 with usage data $d_t$ based on these interactions. The system 120 may collect additional usage data $d_t$ based on, for example, usage data corresponding to the first-generation model $M_0$ as used in interactions between other users and the system 100.

At some point, perhaps based on a predetermined schedule, a change in accuracy of the first-generation model $M_0$, or a threshold amount of usage data $d_t$ collected, the system 100 may commence operations to update the on-device model with the next-generation model $M_1$. The model update process may be iterative based on growing training dataset D. Each dataset from the first dataset $D_1$ up to T datasets may be a superset of the previous dataset (e.g., each datset is a subset of the succeeding dataset):

$$D_1 \subset D_2 \subset \ldots \subset D_t.$$

Each data set may correspond to a model $M_t$ in a sequence of model generations $M_1, M_2, \ldots M_T$. The models may be built successively on the datasets and may be deployed at intervals.

In a scenario in which the size of a model update need not be constrained (for example, based on a size constraint such as an OTA update budget), the training component 240 may train a model M over the dataset D with respect to a loss function L (e.g., to reduce loss/error) to determine an unconstrained ideal model $M_t^*$. In such a scenario, the model generation may be defined approximately as:

$$M_t^* \approx \underset{M}{\mathrm{argmin}} \sum_{(x,y) \in D_t} L(M_t(x), y)$$

(Hereafter, loss of a model M over a dataset D is abbreviated $L_D(M)$.)

When training a model based on a determined size constraint such as an OTA update budget, a series of models $M_1, M_2, \ldots M_T$ may be trained and deployed to reduce a predictive performance regret under the size constraint at each generation t compared to the unconstrained ideal model $M_t^*$. This goal may be expressed as follows:

regret$_t = L_{D_t}(M_t) - L_{D_t}(M_t^*)$ subject to the following constraint:

$\Delta(M_t, M_{t+1}) \leq B$ where $\Delta$ measures a size difference between model generations, and B represents the size constraint; for example, the OTA update budget per generation.

The datasets D may consist of (x,y) pairs where x is a feature vector (e.g., audio features) and y is a label for the instance (e.g., $y \in |C|$ for a classification task such as speech commands, $y \in \Sigma^t$ for sequence labeling such as open vocabulary speech recognition, etc.).

Evolution of the dataset sequence $D_1, D_2, \ldots D_T$ may be considered under two settings. Under a first setting, there may be a global distribution D' from where data may be sampled at all times. However, as the training data becomes more abundant, that is $|D_t| \leq |D_{t+1}|$, the task and associated loss may become more precisely defined. The model $M_t$ may improve performance on its task at each generation due to the system's 100 exposure to more training data $d_t$. Under a second setting, evolution of the dataset D may shift the task. Thus each generation has $D_t \sim D'_t$, but $D|_t \neq D'_{t+1}$. These different distributions may shift the sampling frequency of certain examples (e.g., a trending word or phrase) or the introduction of a new y class label (e.g., a new command enabled for the system 100). While still $|D_t| \leq |D_{t+1}|$, task difficulty may be different during model evolution. Thus, there may not necessarily be an expectation that $L_{D_t}(M_t^*) \geq L_{D_{t+1}}(M_{t+1}^*)$; that is, that a loss of the unconstrained ideal model $M_t^*$ will decrease with additional training. In any case, a data collection component 280 may receive usage data $d_t$ and update the dataset $D_t$, and provide the dataset to the training component 240b. The dataset $D_t$ may evolve from the dataset $D_{t-1}$, for example, by growing with new data and/or by shifting as features of the model are added and/or removed. It may be desirable to have some continuity between the dataset $D_t$ and the dataset $D_{t-1}$; otherwise, it may be difficult to represent parameter changes between the model generation $M_t$ and the model generation $M_{t+1}$ using a model update object $m_{t+1}$ that is significantly smaller than the model $M_{t+1}$ itself while maintaining good performance of the model $M_{t+1}$.

The training component 240b may train a model update object $m_{t+1}$ based on the previous-generation model $M_t$ and the dataset $D_t$ to effect a model update over the network 199 while meeting the determined size constraint B. The training component 240b may train the model update object $m_{t+1}$ by anchoring the previous generation model $M_t$ and learn the model update $$M_{t+1} \approx \underset{|m_{t+1}| \leq B}{\mathrm{argmin}} \; L_{D_{t+1}}(M_t \oplus m_{t+1})$$

where $\oplus$ is an operator expressing an application of the learned model update object $m_{t+1}$ to the previous-generation model $M_t$, and $|m_{t+1}|$ may designate the size constraint (e.g., constraining a data size of the model update object $m_{t+1}$ to be less than or equal to B). To update the previous-generation model $M_t$ on the device 110, the system 120 can send the model update object $m_{t+1}$, which may be constrained by B to be smaller than the next generation model $M_{t+1}$.

In some implementations, the model update object m may be processed as a series of matrix masks corresponding to a weight matrix of the model data M. Each mask may be applied through a simple additive or multiplicative operation to its matching anchored weight matrix during a forward pass of training. The masks may be subject to a data size budget (as opposed to a dimension budget) bounding their footprint; for example, with respect to the determined size constraint. In some implementations, the size of the mask (e.g., the number of enforced zero values) may be increased during successive training epochs until a target characteristic is met.

The device 110 may receive the model update object $m_{t+1}$ and, using a model update component 250, update the previous-generation model $M_t$ to the next generation model $M_{t+1}$. The model update component 250 may include logic and/or software that may take as inputs the model update object $m_{t+1}$ and the previous-generation model $M_t$ and output the next-generation model $M_{t+1}$. In various implementations, the operations to generate the next generation model $M_{t+1}$ may include mathematical operations include vector and/or matrix addition and/or multiplication, hashing, etc. The language processing components 292 may leverage the next-generation model $M_{t+1}$ to process input data 111. Various interactions between the user 5 and the system 100 may generate additional usage data $d_t$ that the system 120 may use to train another model update object m, and the process may repeat.

In some implementations, the model update object m may be used to update different but related models. For example, in speech processing, some models may have portions that vary based on, for example, accent, dialect, entities, etc. In some cases, the models may even have a portion that is personalized to a single user or use group. The model update may, for example, improve several or many personalized or otherwise varied models to accomplish something over all of them, such as improving wakeword detection in noisy environments, adding entities or improving entity granularity, etc. The model update object m may be trained using two or more different but related models to update the portions the models have in common.

In some implementations, the model update object m may be a hashed representation of a weight matrix to which the model update component 250 may apply one or more hash functions to generate the weight matrix, which the model update component 250 may then use to update model weights. Using the hash functions allows the weight matrix to be compressed at the cost of collisions in which the same value of the model update object m updates multiple weights of the model M In some implementations, the hash functions may be changed for each model update to reduce or prevent collisions of the same model weights in successive updates.

In some implementations, the system 100 may use gradients to train the model update object m comprising synthetic input-output pairs, which the model update component 250 may use to retrain the model M on the device 110. In some implementations, the input-output pairs need not represent actual interactions with the system 100, but may be synthetic input-output pairs trained to cause the model update component 250 to train the weights of the on-device model M to approximate or achieve the desired next-generation weights.

Examples of the various implementations of training the model update object m and using it to update the model M on the device 110 are described in further detail below with reference to FIGS. 5 through 11.

Figure 3:
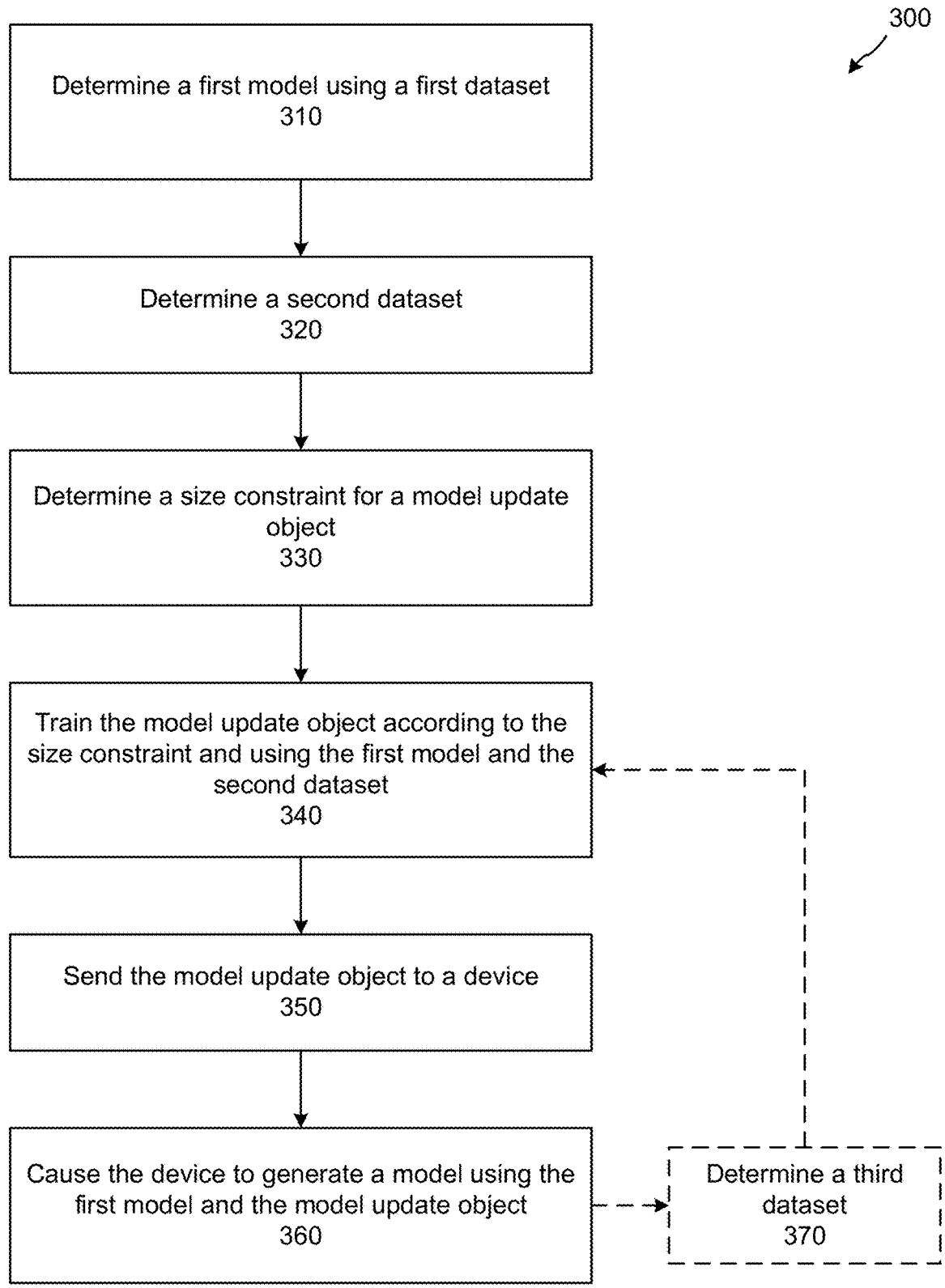
FIG. 3 is a flowchart describing example operations of a method of training a model update object and using it to update an on-device model, according to embodiments of the present disclosure.

FIG. 3 is a flowchart describing example operations of a method 300 of training a model update object and using it to update an on-device model, according to embodiments of the present disclosure. The method 300 may be performed by the system 100 including the system 120 and the device 110. The method 300 may include determining (310) a first machine learning model using a first dataset. The first machine learning model may be trained using the first dataset. The method 300 may include determining (320) a second dataset. The second dataset may represent an evolution of the first dataset in terms of growth and/or shift. In some implementations, the second dataset may be based on, for example, user interactions with the system 100 processed using the first machine learning model. In some implementations, the second dataset may not be based on interactions processed using the first machine learning model, but may represent data annotated or unannotated data prepared for the purpose of refining the first machine learning model and/or adding or removing features from the model. For example, in the case of a speech processing model, the second dataset may include the same words as the first dataset, or the second dataset may include new words and/or omit words that were present in the first dataset. The method 300 may include determining (330) a size constraint for a model update object. The size constraint may be, for example, a desired OTA update budget such as a data size of the model update object. The OTA update budget may specified by the user, device manufacturer, network operator, and/or the provider of the model. In some cases, the size constraint may be determined such that the model update object can be used to generate a second model that achieves a desired accuracy; for example, when used to process inputs in the second dataset. In some implementations, the size constraint may be set as a proportion of the model to be updated; for example, 1%, 5%, 10%, etc. In some implementations, a size constraint may be determined empirically by, for example, training model update objects of decreasing size until a model updated using a model update object fails to achieve a desired accuracy; or, conversely, training model update objects of increasing size until marginal improvements in accuracy of the updated models become insignificant (e.g., reach a point of diminishing returns). The method 300 may include training (340) the model update object according the size constraint using the first machine learning model and the second dataset. The system 100 may train the model update object such that processing the first machine learning model using the model update object will generate a second machine learning model (e.g., the next-generation model). The second machine learning model may reduce a loss relative to the first speech processing model when used to process the second dataset or similar data.

Figure 4:
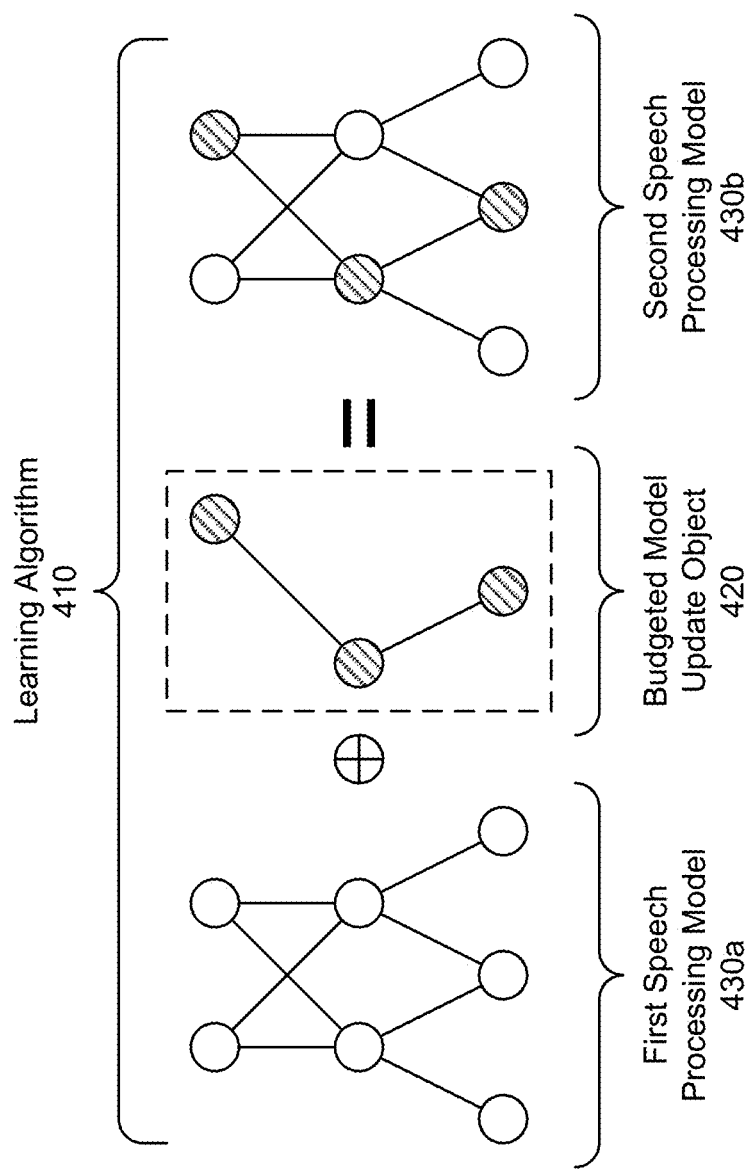
FIG. 4 is a conceptual diagram that illustrates an example learning algorithm for a model update object, according to embodiments of the present disclosure.

FIG. 4 is a conceptual diagram that illustrates an example learning algorithm 410 for a model update object 420, according to embodiments of the present disclosure. The system 100 may use the learning algorithm 410 to train the model update object 420 by anchoring the previous-generation model (e.g., the first speech processing model 430a) and learning the next-generation model (e.g., the second speech processing model 430b) as a result of an operation of the model update object 420 on the previous-generation model. In some implementations, the model update object 420 may be constrained to the size constraint during the training process; for example, by setting it to include no more than a predetermined number of values and/or by having a data size no larger than a certain number of bytes. The size constraint may constrain the model update object to be much smaller than the model itself. In some implementations, the model update object 420 may be trained iteratively based on progressively changing a constraint; for example, by increasing a matrix sparsity of the model update object 420 between successive training epochs. Although the model update object may be determined using operations similar to those used for training the model, the model update object by itself may not be operable to, for example, perform inferences such as classification. Rather, the model update object may be used to update parameters of the model; for example, based on new training data and to improve accuracy of the model in performing inferences. In other words, the model update object may include enough information to update the parameters of the model to generate a next-generation model, but the model update object by itself may not include information sufficient to describe an operable model.

Returning to FIG. 3, the method 300 may include sending (350) the model update object to the device 110 via, for example, the network 199. The model update object may be smaller in size—perhaps an order or more of magnitude smaller—than the second speech processing model; thus transmitting the model update object to the device 110 rather than the second speech processing model itself may be less costly in terms of, for example, a data bandwidth and/or a download data capacity limit of the device 110. The method 300 may include causing (360) the device to generate the second speech processing model using the first speech processing model and the model update object. The device 110 may process the first speech processing model using the model update object; for example, by performing operations corresponding to the operations used in the learning algorithm 410. FIGS. 5 through 11, described below, illustrate operations for training of several example types of model update objects 420 and using them to update the speech processing models 430a/430b, according to various implementations.

In some implementations, the method 300 may repeat certain operations based on new data. Thus, the method 300 may include determining (370) a third dataset; for example, based on input processed by the system 100 using the second speech processing model. The method 300 may return to a previous stage (e.g., the stage 340) and repeat certain operation to generate a new model update object based on the third dataset and provide the new model update object to the device 110, and so on. Although the method 300 is described in the context of speech processing models, the same operations may apply to updating different types of models and/or models applied to different processing tasks.

FIG. 5 is a flowchart describing example operations of a method 500 of training a model update object and using it to update an on-device model, according to embodiments of the present disclosure. In the example shown in FIG. 5, the model update object may take the form of a sparse array or matrix, and training operations may iterate until a determined size constraint is achieved (e.g., the model update object has the desired sparsity or is within a predetermined data size to meet an OTA update budget target). A sparse model update object may be an array or matrix where many of the elements are null values. The null values may not increase the data size of the model update object; thus increasing the sparsity of the model update object may reduce its overall data size. The null values may be, for example, zeroes, which may leave previous-generation weights unchanged in additive operations, or ones, which may leave previous-generation weights unchanged in multiplicative operations. Sparsity may be conveyed as a proportion; for example, a model update object that is 50% sparse may include null values in half of its elements, a model update object that is 90% sparse may include null values in nine tenths of its elements, etc. The method 500 may include taking a new dataset 510 and a previous-generation model 520 as inputs to determine (530) a result of a loss function when the new dataset 510 is processing using the previous-generation model 520 as modified by the model update object. The method 500 may determine (decision block 540) whether to iterate this step based on, for example, achieving a target loss value, detecting local minimum using a gradient descent algorithm, and/or until a predetermined number of iterations have been performed. If the method 500 is to iterate the training operations ("Yes" at the decision block 540), the method 500 may include adjusting (550) weights of the model update object using, for example, a gradient descent algorithm and/or back propagation. If the method 500 is not to iterate the training operations any further in this training epoch ("No" at the decision block 540), the method 500 may proceed to the decision block 560.

The method 500 may determine (decision block 560) whether the model update object has met the size constraint. For example, the method 500 may determine whether or not the model update object meets a size and/or sparsity characteristic. If the size constraint is not met ("No" at the decision block 560), the method 500 may increase (570) the sparsity of the model update object.

FIG. 6 is a conceptual diagrams that illustrates training a sparse matrix model update object 620 over several training epochs, and using the model update object 620 to update model weights 630, according to embodiments of the present disclosure. The system 100 trains the model update object 620 using the previous-generation model weights 610 as an anchor (for example, in FIG. 6, the previous-generation model weights 610 do not change through the training epochs). The system 100 can modify the previous-generation model weights 610 using the model update object 620 to generate the next-generation model weights 630. After the first training epoch 650, the model update object 620a may little or no sparsity as indicated by empty cells (white with no cross hatching). During a second training epoch 660, the sparsity of the model update object 620 may be increased via pruning. For example, certain elements of the model update object 620 may be pruned. For example, in the case of additive weight modifiers, the system 100 may prune and mask elements by setting the value of that element of the matrix to a value of zero, and masking it to keep the value at zero through subsequent training by using a mask. In the case of multiplicative weight modifiers, the system may prune and mask elements by setting the value of that element of the matrix to a value of 1, and masking it to keep the value at 1 through subsequent training. The system 100 may prune elements having a value within a certain range and/or above or below a certain threshold, and mask the pruned elements through subsequent training. The system 100 may prune a certain number of elements—for example, 10, 25, or 50% of the matrix elements—which may be chosen based on, for example, which elements have the lowest magnitude. The size of the mask—that is, the number of elements pruned and kept to zero or 1—may be increased between successive training epochs. For example, between the first training epoch 650 and the second training epoch 660, sparsity of the model update object 620b may be set to 50% (e.g., half of the matrix elements set to zero). Then, between the second training epoch 660 and the third training epoch 670, the sparsity of the model update object 620c may be increased by another 25% (e.g., to set half of the remaining values to zero). In another example, the sparsity of the model update object 620b may be set to 90% between the first training epoch 650 and the second training epoch 660, and the sparsity of the model update object 620c may be set to 99% between the second training epoch 660 and the third training epoch 670. In various implementations, training may include more or fewer training epochs, and sparsity of the model update object 620 may be increased using various manners of progression; for example, linear, geometric, exponential, etc. In some implementations, for a target sparsity $s_f$, an initial pruning step $r_o$, and a final pruning step $r_f$, the system may prune the $s_r$ fraction of the weights/values in the model update object 620 (e.g., by pruning weights of the least magnitude and masking those elements) according to the following schedule:

$$s_r = s_f \cdot \left(1 - \left(1 - \frac{r - r_0}{r_f - r_0}\right)^3\right)$$

Since the training prunes weights of the model update object 620, rather than the next-generation model weights 630, the next-generation model weights 630 may remain fully dense after application of the model update object 620. In other words, when a masked weight of the model update object 620 is pruned, the resulting weights of the next-generation model weights 630 are not "zeroed-out"; rather, a weight value from the previous-generation model weights 610 may be carried forward to the next-generation model weights 630 (e.g., by adding zero or multiplying by 1).

By iteratively training the model update object 620 in this manner—e.g., by employing progressive pruning and masking to achieve a target sparsity and/or data size—the model update object 620 may be trained in each epoch to reduce loss based on the values of the remaining elements as applied to the previous-generation model weights 610 to generate the next-generation model weights 630*a*, 630*b*, 630*c*, etc. Such iterative training may produce improved results relative to, for example, achieving the target sparsity and/or data size by performing a single pruning operation following a single training epoch.

Returning to FIG. 5, if the size constraint is met ("Yes" at the decision block 560), for example, because the model update object has achieved the target sparsity and/or data size associated with the OTA update budget, the method 500 may include sending (580) the model update object to the device 110. The method 500 may include causing (590) the device to determine a next-generation model using the previous-generation model and the model update object sent during the previous stage, as described below with reference to FIG. 7.

FIG. 7 is a conceptual diagram illustrating successive updates to an on-device model using the sparse matrix model update object, according to embodiments of the present disclosure. The system 120 may provide updates to a vehicle-based device in the vehicle 110*e* via a wireless access point 710 (for example, a Wi-Fi access point, a cellular tower, a satellite link, etc.). The vehicle 110*e* may have a model version 3.0 ("V3.0") 720*a* denoted as $M_{t-1}$. The system 120 may update the on-device model through various versions 720*b*, 720*c*, 720*d*, etc. by providing updates 730*a*, 730*b*, 730*c*, etc.

In a first model update, the system 120 may provide a model update object 730*a* for a model V3.1. The vehicle 110*e* may receive the model update object 730*a* and use it to modify weights of the model V3.0 720*a* to generate the model V3.1 720*b*. The vehicle 110*e* may perform the update by, for example, performing mathematical operations using the model update object 730*a* and the model V3.0 720*a*; for example, adding and/or multiplying the weights of the model update object 730*a* and the weights of the model V3.0 720*a*, and/or performing other operations. In a second model update, the system 120 may provide a model update object 730*b* for a model V3.2. The vehicle 110*e* may receive the model update object 730*b* and use it to modify the model V3.1 720*b* to generate the model V3.2 720*c*. In a third model update, the system 120 may provide a model update object 730*c* for a model V3.3. The vehicle 110*e* may receive the model update object 730*c* and use it to modify the model V3.2 720*c* to generate the model V3.3 720*d*. The process may continue with additional periodic or intermittent updates to update the on-device model by sending the model update object 730 that is relatively small compared to the model 720 itself, thus conserving bandwidth and capacity limits in the OTA link between the system 120 and the vehicle 110*e*.

FIG. 8 is a flowchart describing example operations of a method 800 of training a model update object in the form of a hashed representation of weights, and using it to update an on-device model, according to embodiments of the present disclosure. In the example shown in FIG. 8, the model update object may take the form of a hashed representation of a matrix (or other data structure) of weights that may be used to update model weights. The model update object itself may take the form of a vector or array, although various data structures are possible without departing from the general concepts described herein. In the method 800, the system 100 may determine a size constraint such as a data size (e.g., in megabytes) and/or dimensions of the model update object (e.g., a number of values included in hashed representation). The method 800 may include taking a new dataset 810 and a previous-generation model 820 as inputs to determine (830) a result of a loss function when the new dataset 810 is processing using the previous-generation model 820 as modified by the model update object. During training, and subsequently during the model update, the model update object may processed using one or more predetermined functions to generate a vector or matrix of weights. The predetermined function may include, for example, a function that may map the values of the model update object (which may have a certain number of elements arranged in a certain number of dimensions) to an array or matrix of weights (which may have a different number of elements arranged in a different number of dimensions) that can be applied (e.g., using mathematic operations) to the previous-generation model 820. The predetermined function may map values from a first vector, array, or matrix having first size and/or dimensions to a second vector, array, or matrix having a second size and/or dimensions. The mapping may be based on a structured, random, and/or pseudo random placement. In some implementations, the predetermined function may map the values without modifying them. In some implementations, the predetermined function may modify the values (e.g., using arithmetic operations) to generate the weights. The predetermined function can be used to generate a plurality of values of a predetermined size (and/or less than a predetermined size) that can be expanded to generate a plurality of weights for updating the model in a repeatable fashion; that is, processing the values using the predetermined function(s) in the centralized system 120 may generate the same results as processing the values using the predetermined function(s) on the device 110. The hashing process may be used as a form of compression for the model update object; that is, the predetermined function(s) allow the model update object to be smaller in size and/or dimension than the data it will update.

The vector/array/matrix of weights may be used to modify the weights of the previous-generation model. The values of the model update object may be iteratively adjusted during training, with the model update object hashed using the predetermined function(s), and the resulting hashed weights used to modify the previous-generation model. Because the model update object may be hashed to generate a number of weights greater than the number of values in the model update object itself, the model update object represents a compressed version of the parameter data that may be used to update the previous-generation model weights. Due to this compression, hashing the model update object may result in collisions, in which the same value is used to update multiple weights of the previous-generation model. Thus, in some implementations, the one or more hash functions may be re-seeded or otherwise changed between successive generations of model updates.

In some implementations, given a weight matrix $W_t$ of $M_t$, the system 100 may train an array of weights $A_{t+1}$ so that:

$$W_{t+1}^{(i,j)} = W_t^{(i,j)} \left( \sum_{k=1}^{K} A_{t+1}[h_k(i,j)] \right)$$

Where $W_{t+1}^{(i,j)}$ is the (i,j)th entry of the updated weights for model generation $M_{t+1}$, and $h_k$ is one of K hash functions randomly hashing weight positions into locations of A. The size of A may be chosen to match the determined size constraint B, which may be smaller than the size of W. As a result, may result in collisions, which may lead to randomized weight sharing in W.

In some implementations, a scaling factor may be applied when unpacking the model update object to reduce these collisions. For example, the system 100 may add a scaling factor $|W_t^{(i,j)}|$ as follows:

$$W_{t+1}^{(i,j)} = W_t^{(i,j)} + |W_t^{(i,j)}| \sum_{k=1}^{K} A_{t+1}[h_k(i,j)]$$

This factor may change what would be an additive update operation into a multiplicative one, with the added benefit that when expressed this way allows the trainable weight distribution to be centered at zero (i.e., such that identity is 0 instead of 1). Thus, scaling may be more effective than plain additive weight updating because it may be easier to shift a pair of colliding weights the same amount proportionally rather than absolutely (for example, consider the relative effect of a same proportional adjustment on a large weight value and a small weight value, versus a same additive adjustment on the large weight value and the small weight value).

The method 800 may determine (decision block 840) whether to further iterate training based on, for example, achieving a target loss value, detecting local minimum using a gradient descent algorithm, and/or until a predetermined number of iterations have been performed. If the method 800 is to iterate the training operations further ("Yes" at the decision block 840), the method 800 may include adjusting (850) values of the hashed model update object using, for example, a gradient descent algorithm and/or other algorithm. The method 800 may include processing (860) the adjusted values from the stage 850 using the predetermined function to determine a new plurality of weights before returning to the stage 830. If the method 800 is not to iterate further in this training epoch ("No" at the decision block 540), the method 500 may include sending (870) the model update object to a device 110. The method 880 may include causing (880) the device 110 to determine a next-generation model using the previous-generation model and the model update object. The device 110 may hash the model update object to determine the plurality of weights for updating the previous-generation model, as further described below with reference to FIG. 9.

FIG. 9 is a conceptual diagram illustrating successive updates to an on-device model using the hashed model update object, according to embodiments of the present disclosure. The system 120 may provide updates to a vehicle-based device in the vehicle 110e via a wireless access point 710. The vehicle 110e may have a model version 3.0 ("V3.0") 920a denoted as $M_{t-1}$. The system 120 may update the on-device model through various versions 920b, 920c, 920d, etc. by providing updates 930a, 930b, 930c, etc.

In a first model update, the system 120 may provide a model update object 930a for a model V3.1 in the form of a hashed representation ht. The vehicle 110e may receive the model update object 930a and hash it using one or more hash functions to determine a plurality of weights 940a denoted as $m_t$. The vehicle 110e may use plurality of weights 940a to modify the model V3.0 920a to generate the model V3.1 920b. The vehicle 110e may modify the model V3.0 920a by, for example, performing mathematical operations using the plurality of weights 940a and the model V3.0 920a; for example, adding the weights of the model update object 930a to the weights of the model V3.0 920a, multiplying the weights the model update object 930a and the model V3.0 920a, and/or performing other operations.

In a second model update, the system 120 may provide a model update object 930b for a model V3.2 in the form of a hashed representation $h_{t+1}$. The vehicle 110e may receive the model update object 930b and hash it using one or more hash functions to determine a plurality of weights 940b denoted as $m_{t+1}$. Note that from generation to generation, the hash function(s) used to hash the model update object 930 may be re-seeded or otherwise changed to prevent the same weights from colliding update after update. The vehicle 110e may use plurality of weights 940b to modify the model V3.1 920b to generate the model V3.2 920c.

In a third model update, the system 120 may provide a model update object 930c for a model V3.3 in the form of a hashed representation $h_{t+2}$. The vehicle 110e may receive the model update object 930c and hash it using one or more hash functions to determine a plurality of weights 940c denoted as $M_{t+2}$. The vehicle 110e may use plurality of weights 940c to modify the model V3.2 920c to generate the model V3.3 920d. The process may continue with additional periodic or intermittent updates to update the on-device model by sending the model update object 930 that is relatively small compared to the models 920 themselves, thus conserving bandwidth and capacity limits in the OTA link between the system 120 and the vehicle 110e.

FIG. 10 is a flowchart describing example operations of a method 1000 of training a set of input-output pairs and using it to update an on-device model, according to embodiments of the present disclosure. This technique can leverage a device's ability to compute gradients locally using a model update object comprising a set of input-output pairs. The gradient of the model may be computed on the user device based on the previous-generation model and using the set of input-output pairs. The device may then apply the gradients to generate the next-generation model based on the previous-generation model. The input-output pairs may not be actual model inputs in the training dataset, but rather may be synthetic input-output pairs that the system 100 may train to summarize a direction for weights of the previous-generation model to move to reduce loss when processing the new dataset. In some implementations, the system 100 may derive gradients for the input-output pairs using a loss function different from that used to calculate gradients based on the training dataset. For example, in the case of an ASR model, the system 100 may train the input-output pairs using a stronger signal, such as an L2 loss, rather than an ASR loss.

The method 1000 may include taking a second dataset 1010 and a previous-generation model 1020 as inputs to determine (1030) a next-generation model. The method 1000 may include determining (1040) gradient data representing one or more gradients calculated between the previous-generation model 1020 and the next-generation model. As discussed above, the gradients need not be derived using the same loss functions used at the stage 1030 to determine the next-generation model using the second dataset 1010; indeed, the system 100 may use a stronger loss signal. The method 1000 may include determining (1050) a set of input-output pairs for training the previous-generation model 1020 to generate an approximation of the next-generation model. A size of the set (e.g., the number, dimension, and/or precision of the input-output pairs) may be based on a size constraint such as an OTA update budget. Based on the size constraint, the system 100 may train the set of input-output pairs to generate an approximation of the next-generation model when the previous-generation model is trained on the device 110 using the set. The method 1000 may include sending (1060) the model update object to a device 110. The method 1000 may include causing (1070) the device 110 to generate an approximation of the next-generation model using the previous-generation model and the input-output pairs. The device 110 may process the input-output pairs represented in the model update object and the previous-generation model 1020 to generate the next-generation model, which may approximate the next-generation model as determined at the stage 1030. The device 110 may perform processing operations analogous to model training that, for example, employ a gradient descent and/or back propagation algorithm to determine new weights for the model based on processing the inputs of the input-output pairs using the model and using the outputs of the input-output pairs as a ground truth.

FIG. 11 is a conceptual diagram illustrating successive updates to an on-device model using a model update object comprising input-output pairs, according to embodiments of the present disclosure. The system 120 may provide updates to a vehicle-based device in the vehicle 110e via a wireless access point 710. The vehicle 110e may have a model version 3.0 ("V3.0") 1120a denoted as $M_{t-1}$. The system 120 may update the on-device model through various versions 1120b, 1120c, 1120d, etc. by providing updates 1130a, 1130b, 1130c, etc.

In a first model update, the system 120 may provide a model update object 930a for a model V3.1, where the model update object 930a represents a set of input-output pairs, denoted pt. The vehicle 110e may receive the model update object 1130a and use the input-output pairs to train the model V3.0 1120a to generate the model V3.1 1120b. A processing component 1150 may take the previous-generation model 1120a and the set of input-output pairs in the model update object 1130a as inputs, and calculate gradients to determine new weights for reducing a loss of the model 1120 when processing the input-output pairs in the model update object 1130a. The processing component 1150 may determine new weights for the model 1120, and use the new weights to generate the model V3.1 1120b.

In a second model update, the system 120 may provide a model update object 930b for a model V3.2. The vehicle 110e may receive the model update object 1130b and use it to train the model V3.0 1120a to generate the model V3.1 1120b. The processing component 1150 may take the previous-generation model 1120b and the set of input-output pairs in the model update object 1130b as inputs, and calculate gradients to determine new weights for reducing a loss of the model 1120 when processing the input-output pairs in the model update object 1130b. The processing component 1150 may determine new weights for the model 1120, and use the new weights to generate the model V3.2 1120c. The process may continue with additional periodic or intermittent updates to the on-device model.

Figure 12:
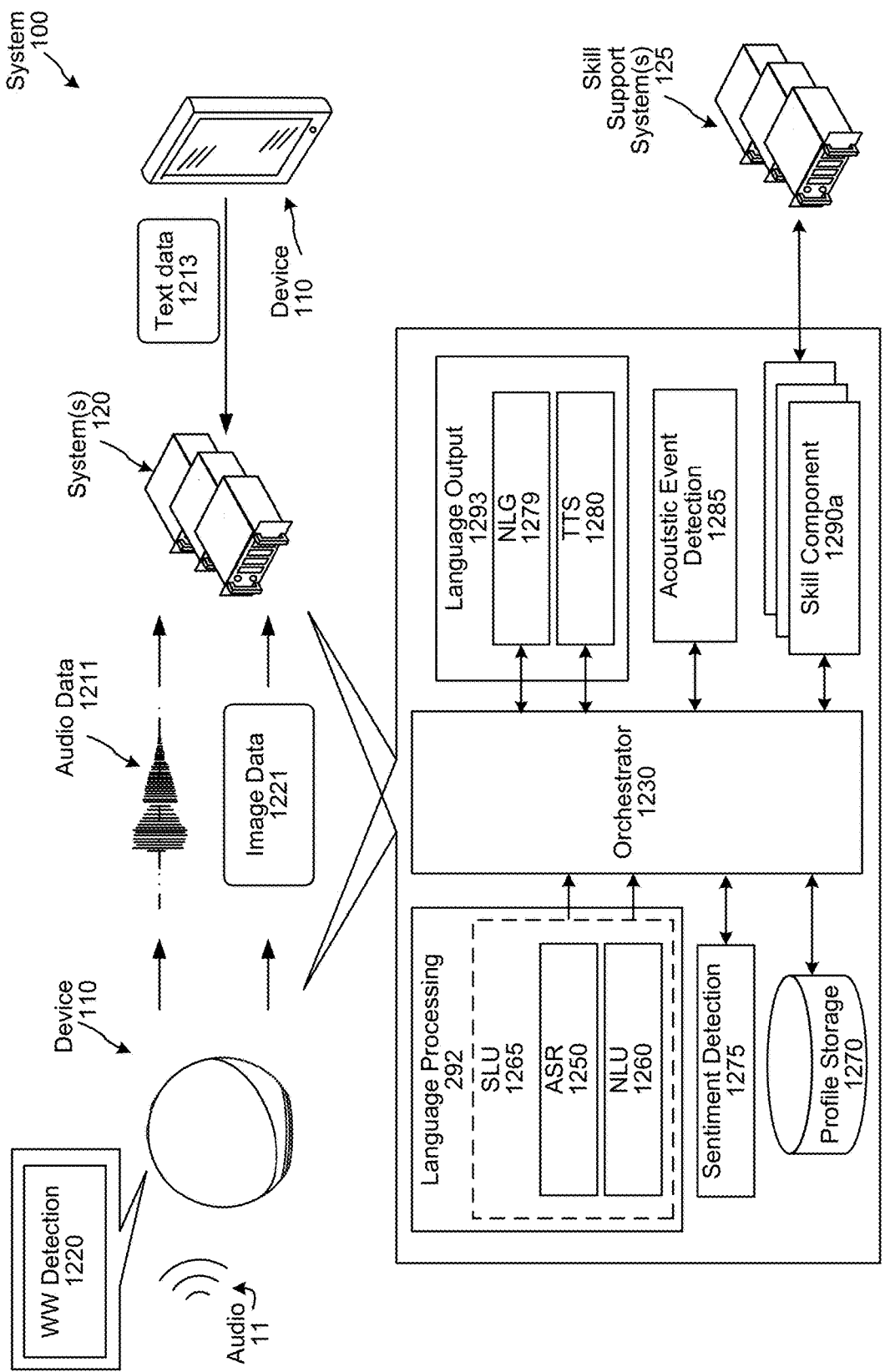
FIG. 12 is a conceptual diagram of components of the system, according to embodiments of the present disclosure.

FIG. 12 is a conceptual diagram of components of the system 100, according to embodiments of the present disclosure. The system 100 may operate using various components as described in FIG. 12. The various components may be located on same or different physical devices. Communication between various components may occur directly or across a network(s) 199. The device 110 may include audio capture component(s), such as a microphone or array of microphones of a device 110, captures audio 11 and creates corresponding audio data 1211. Once speech is detected in audio data representing the audio 11, the device 110 may determine if the speech is directed at the device 110/system 120. In at least some embodiments, such determination may be made using a wakeword detection component 1220. The wakeword detection component 1220 may be configured to detect various wakewords. In at least some examples, each wakeword may correspond to a name of a different digital assistant. An example wakeword/digital assistant name is "Alexa." In another example, input to the system may be in form of text data 1213, for example as a result of a user typing an input into a user interface of device 110. Other input forms may include indication that the user has pressed a physical or virtual button on device 110, the user has made a gesture, etc. The device 110 may also capture images using camera(s) 1718 of the device 110 and may send image data 1221 representing those image(s) to the system 120. The image data 1221 may include raw image data or image data processed by the device 110 before sending to the system 120.

The wakeword detection component 1220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. The model or models employed for wakeword detection may be updated using a model update object as described herein.

Once the wakeword is detected by the wakeword detection component 1220 and/or input is detected by an input detector, the device 110 may "wake" and begin transmitting audio data 1211, representing the audio 11, to the system(s) 120. The audio data 1211 may include data corresponding to the wakeword; in other embodiments, the portion of the audio corresponding to the wakeword is removed by the device 110 prior to sending the audio data 1211 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 1220 may result in sending audio data to a first system 120 for processing while detection of the wakeword "Computer" by the wakeword detector may result in sending audio data to a second system 120 for processing. The system may have a separate wakeword and system for different skills/systems (e.g., "Dungeon Master" for third system 120 a game play skill/system) and/or such skills/systems may be coordinated by one or more skill(s) 1290 of one or more systems 120.

Upon receipt by the system(s) 120, the audio data 1211 may be sent to an orchestrator component 1230. The orchestrator component 1230 may include memory and logic that enables the orchestrator component 1230 to transmit various pieces and forms of data to various components of the system, as well as perform other operations as described herein.

The orchestrator component 1230 may send the audio data 1211 to a language processing component 292. The language processing component 292 (includes an automatic speech recognition (ASR) component 1250, a natural language understanding (NLU) component 1260, and/or a spoken language understanding (SLU) component 1265. The ASR component 1250 may transcribe the audio data 1211 into text data. The text data output by the ASR component 1250 represents one or more than one (e.g., in the form of an N-best list) ASR hypotheses representing speech represented in the audio data 1211. The ASR component 1250 interprets the speech in the audio data 1211 based on a similarity between the audio data 1211 and pre-established language models. For example, the ASR component 1250 may compare the audio data 1211 with models for sounds (e.g., acoustic units such as phonemes, senons, phones, etc.) and sequences of sounds to identify words that match the sequence of sounds of the speech represented in the audio data 1211. The ASR component 1250 can send the resulting ASR output data 1510 (e.g., text data) generated thereby to an NLU component 1260, via, in some embodiments, the orchestrator component 1230. The ASR output data 1510 sent from the ASR component 1250 to the NLU component 1260 may include a single top-scoring ASR hypothesis or may include an N-best list including multiple top-scoring ASR hypotheses. An N-best list may additionally include a respective score associated with each ASR hypothesis represented therein. ASR models such as acoustic models, language models, and/or finite state transducers (FST) may be updated using a model update object as described herein. The ASR component 1250 is described in greater detail below with regard to FIG. 13.

The language processing component 292 may further include a NLU component 1260. The NLU component 1260 may receive the text data from the ASR component. The NLU component 1260 may attempts to make a semantic interpretation of the phrase(s) or statement(s) represented in the text data input therein by determining one or more meanings associated with the phrase(s) or statement(s) represented in the text data. The NLU component 1260 may determine an intent representing an action that a user desires be performed and may determine information that allows a device (e.g., the device 110, the system(s) 120, a skill component 1290, a skill system(s) 125, etc.) to execute the intent. For example, if the text data corresponds to "play the 5th Symphony by Beethoven," the NLU component 1260 may determine an intent that the system output music and may identify "Beethoven" as an artist/composer and "5th Symphony" as the piece of music to be played. For further example, if the text data corresponds to "what is the weather," the NLU component 1260 may determine an intent that the system output weather information associated with a geographic location of the device 110. In another example, if the text data corresponds to "turn off the lights," the NLU component 1260 may determine an intent that the system turn off lights associated with the device 110 or the user 5. However, if the NLU component 1260 is unable to resolve the entity—for example, because the entity is referred to by anaphora such as "this song" or "my next appointment"—the language processing component 292 can send a decode request to another language processing component 292 for information regarding the entity mention and/or other context related to the utterance. The language processing component 292 may augment, correct, or base results data upon the audio data 1211 as well as any data received from the other language processing component 292.

The NLU component 1260 may return NLU results data 1585/1525 (which may include tagged text data, indicators of intent, etc.) back to the orchestrator component 1230. The orchestrator component 1230 may forward the NLU results data to a skill component(s) 1290. If the NLU results data includes a single NLU hypothesis, the NLU component 1260 and the orchestrator component 1230 may direct the NLU results data to the skill component(s) 1290 associated with the NLU hypothesis. If the NLU results data 1585/1525 includes an N-best list of NLU hypotheses, the NLU component 1260 and the orchestrator component 1230 may direct the top scoring NLU hypothesis to a skill component(s) 1290 associated with the top scoring NLU hypothesis. The system may also include a post-NLU ranker 1565 which may incorporate other information to rank potential interpretations determined by the NLU component 1260. The user device 110 may also include its own post-NLU ranker 1565, which may operate similarly to the post-NLU ranker 1565. NLU may involve the application of various models that may be updated with a model update object using the techniques described herein. The NLU component 1260, post-NLU ranker 1565 and other components are described in greater detail below with regard to FIGS. 14 and 15.

In some implementations, the ASR component 1250 and the NLU component 1260 may be combined for form an SLU component 1265. The SLU component 1265 may use an end-to-end model that combines the functions of ASR and NLU models to take audio data as input and infer executable data including intent and/or entity data directly; e.g., perhaps without outputting a transcription of the audio data separately or as an intermittent step in the speech processing. End-to-end SLU models may get very large in size, and thus be particularly appropriate for OTA updates as described herein.

The system 120 may include an acoustic event detection (AED) component 1285. The AED component 1285 may compare input audio data to an audio signature corresponding to the acoustic event and, if there is a sufficient match between the signature and the input audio data, the system 120 may determine that an acoustic event has occurred and take action accordingly. The AED component 1285 may detect, for example, acoustic events such as a baby crying, an alarm, a window breaking, shouting or yelling, etc. The AED component 1285 may process the audio data 1211 (or acoustic feature vectors derived from the audio data 1211) using an AED model. The AED model may include a long short-term memory (LSTM) network to "listen" to input audio over a context window (e.g., from a fraction of a second to several seconds). The recurrent nature of the LSTM network means that the AED model need not process each acoustic feature vector of its context window simultaneously, but may process the acoustic feature vectors individually or in subsets while the LSTM network "remembers" the processing of earlier subsets. In some implementations, the AED component 1285 may include alternative or additional AED models such as a DNN or CNN. Regardless of the model or models employed, the AED model(s) may be updated using a model update object as described herein.

A skill component may be software running on the system(s) 120 that is akin to a software application. That is, a skill component 1290 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 1290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pi5 with respect to the restaurant's online ordering system, etc. A skill component 1290 may operate in conjunction between the system(s) 120 and other devices, such as the device 110, in order to complete certain functions. Inputs to a skill component 1290 may come from speech processing interactions or through other interactions or input sources. A skill component 1290 may include hardware, software, firmware, or the like that may be dedicated to a particular skill component 1290 or shared among different skill components 1290.

A skill support system(s) 125 may communicate with a skill component(s) 1290 within the system(s) 120 and/or directly with the orchestrator component 1230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pi5 skill may enable a skill support system(s) 125 to order a pi5 with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 1290 dedicated to interacting with the skill support system(s) 125. Unless expressly stated otherwise, reference to a skill, skill device, or skill component may include a skill component 1290 operated by the system(s) 120 and/or skill operated by the skill support system(s) 125. Moreover, the functionality described herein as a skill or skill may be referred to using many different terms, such as an action, bot, app, or the like. The skill 1290 and or skill support system(s) 125 may return output data to the orchestrator component 1230.

The system 120 includes a language output component 1293. The language output component 1293 includes a natural language generation (NLG) component 1279 and a text-to-speech (TTS) component 1280. The NLG component 1279 can generate text for purposes of TTS output to a user. For example the NLG component 1279 may generate text corresponding to instructions corresponding to a particular action for the user to perform. The NLG component 1279 may generate appropriate text for various outputs as described herein. The NLG component 1279 may include one or more trained models configured to output text appropriate for a particular input. The text output by the NLG component 1279 may become input for the TTS component 1280 (e.g., output text data 1610 discussed below). Alternatively or in addition, the TTS component 1280 may receive text data from a skill 1290 or other system component for output.

The NLG component 1279 may include a trained model. The NLG component 1279 generates text data 1610 from dialog data received (e.g., from or by a dialog manager) such that the output text data 1610 has a natural feel and, in some embodiments, includes words and/or phrases specifically formatted for a requesting individual. The NLG may use templates to formulate responses. And/or the NLG system may include models trained from the various templates for forming the output text data 1610. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather _information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 1280.

The TTS component 1280 may generate audio data (e.g., synthesized speech) from text data using one or more different methods. Text data input to the TTS component 1280 may come from a skill component 1290, the orchestrator component 1230, or another component of the system. In one method of synthesis called unit selection, the TTS component 1280 matches text data against a database of recorded speech. The TTS component 1280 selects matching units of recorded speech and concatenates the units together to form audio data. In another method of synthesis called parametric synthesis, the TTS component 1280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras 1718 to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 1211 representing the commands to the system(s) 120 for processing, after which the system(s) 120 may return output data that can cause the device 110 to engage its camera.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 120 may also include a sentiment detection component 1275 that may be configured to detect a sentiment of a user from audio data 1211 representing speech/utterances from the user, image data 1221 representing an image of the user, and/or the like. The sentiment detection component 1275 may be included in the device 110 and/or system(s) 120, as illustrated in FIG. 12, although the disclosure is not limited thereto and the sentiment detection component 1275 may be included in other components without departing from the disclosure; for example, as a skill component 1290 and/or as a separate component, etc. The system 120 may use the sentiment detection component 1275 to, for example, customize a response for a user based on an indication that the user is happy or frustrated. The sentiment detection component 1275 may predict from multiple sentiment categories, including but not limited to, happiness, sadness, anger and neutral. In an example embodiment, the sentiment category XXH55 may be determined after score(s) XXH50 have been determined for a particular period of time of input audio data. In an example embodiment, the sentiment categories may be broad such as positive, neutral, and negative or may be more precise such as angry, happy, distressed, surprised, disgust, or the like. The sentiment detection component 1275 may employ one or more models for processing various inputs. For example, a first trained model may process audio frame feature vectors, image feature vectors, and/or word feature vectors using, for example, an LSTM to determine one or more scores corresponding to a sentiment category/categories at a word level. A second trained model may process utterance feature vectors using, for example, a fully-connected neural network to determine one or more scores corresponding to a sentiment category/categories at an utterance level. Regardless of the specific model or models employed, the model(s) of sentiment detection component 1275 may be updated using a model update object as described herein.

Figure 13:
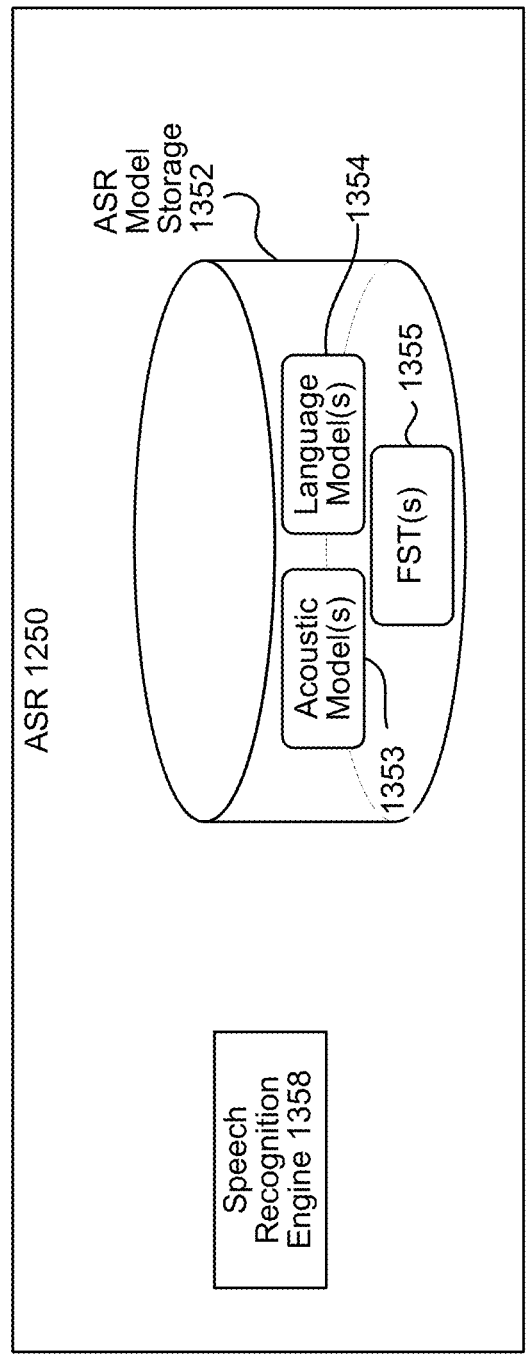
FIG. 13 is a conceptual diagram of an ASR component, according to embodiments of the present disclosure.

FIG. 13 is a conceptual diagram of an ASR component 1250, according to embodiments of the present disclosure. The ASR component 1250 may interpret a spoken natural language input based on the similarity between the spoken natural language input and pre-established language models 1354 stored in an ASR model storage 1352. For example, the ASR component 1250 may compare the audio data with models for sounds (e.g., subword units or phonemes) and sequences of sounds to identify words that match the sequence of sounds spoken in the natural language input. Alternatively, the ASR component 1250 may use a finite state transducer (FST) 1355 to implement the language model functions.

When the ASR component 1250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1353 stored in the ASR model storage 1352), and the likelihood that a particular word, which matches the sounds, would be included in the sentence at the specific location (e.g., using a language or grammar model 1354). Based on the considered factors and the assigned confidence score, the ASR component 1250 may output an ASR hypothesis that most likely matches the spoken natural language input, or may output multiple ASR hypotheses in the form of a lattice or an N-best list, with each ASR hypothesis corresponding to a respective score.

The ASR component 1250 may include a speech recognition engine 1358. The ASR component 1250 receives audio data 1211 (for example, received from a user device 110 having processed audio detected by a microphone by an acoustic front end (AFE) or other component). The speech recognition engine 1358 compares the audio data 1211 with acoustic models 1353, language models 1354, FST(s) 1355, and/or other data models and information for recognizing the speech conveyed in the audio data. The audio data 1211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1358 may process the audio data 1211 with reference to information stored in the ASR model storage 1352. Feature vectors of the audio data 1211 may arrive at the system 120 encoded, in which case they may be decoded prior to processing by the speech recognition engine 1358.

The speech recognition engine 1358 attempts to match received feature vectors to language acoustic units (e.g., phonemes) and words as known in the stored acoustic models 1353, language models 12B54, and FST(s) 1355. For example, audio data 1211 may be processed by one or more acoustic model(s) 1353 to determine acoustic unit data. The acoustic unit data may include indicators of acoustic units detected in the audio data 1211 by the ASR component 1250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1354 (and/or using FST 1355) to determine ASR output data 1510. The ASR output data 1510 can include one or more hypotheses. One or more of the hypotheses represented in the ASR output data 1510 may then be sent to further components (such as the NLU component 1260) for further processing as discussed herein. The ASR output data 1510 may include representations of text of an utterance, such as words, subword units, or the like.

The speech recognition engine 1358 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 1250 will output ASR hypotheses that make sense grammatically. The specific models used may be general models or may be models corresponding to a particular domain, such as music, banking, etc.

The speech recognition engine 1358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1358 may use the acoustic model(s) 1353 to attempt to match received audio feature vectors to words or subword acoustic units. An acoustic unit may be a senone, phoneme, phoneme in context, syllable, part of a syllable, syllable in context, or any other such portion of a word. The speech recognition engine 1358 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 1250 outputs ASR hypotheses that make sense grammatically.

The speech recognition engine 1358 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1358, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1358 may also compute scores of branches of the paths based on language models or grammars. Language modeling involves determining scores for what words are likely to be used together to form coherent words and sentences. Application of a language model may improve the likelihood that the ASR component 1250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 14:
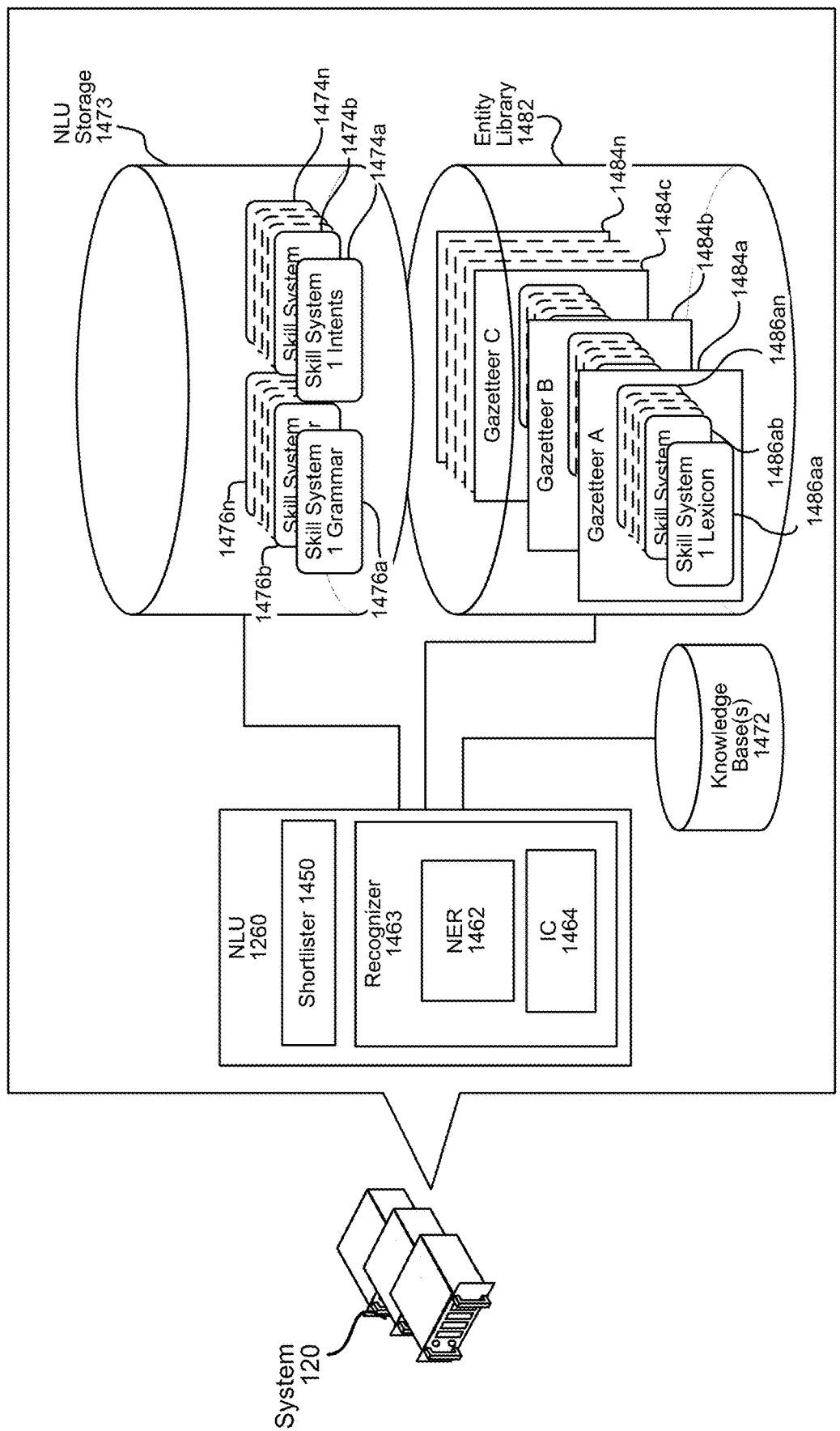
FIG. 14 is a conceptual diagram of how natural language processing is performed, according to embodiments of the present disclosure.
Figure 15:
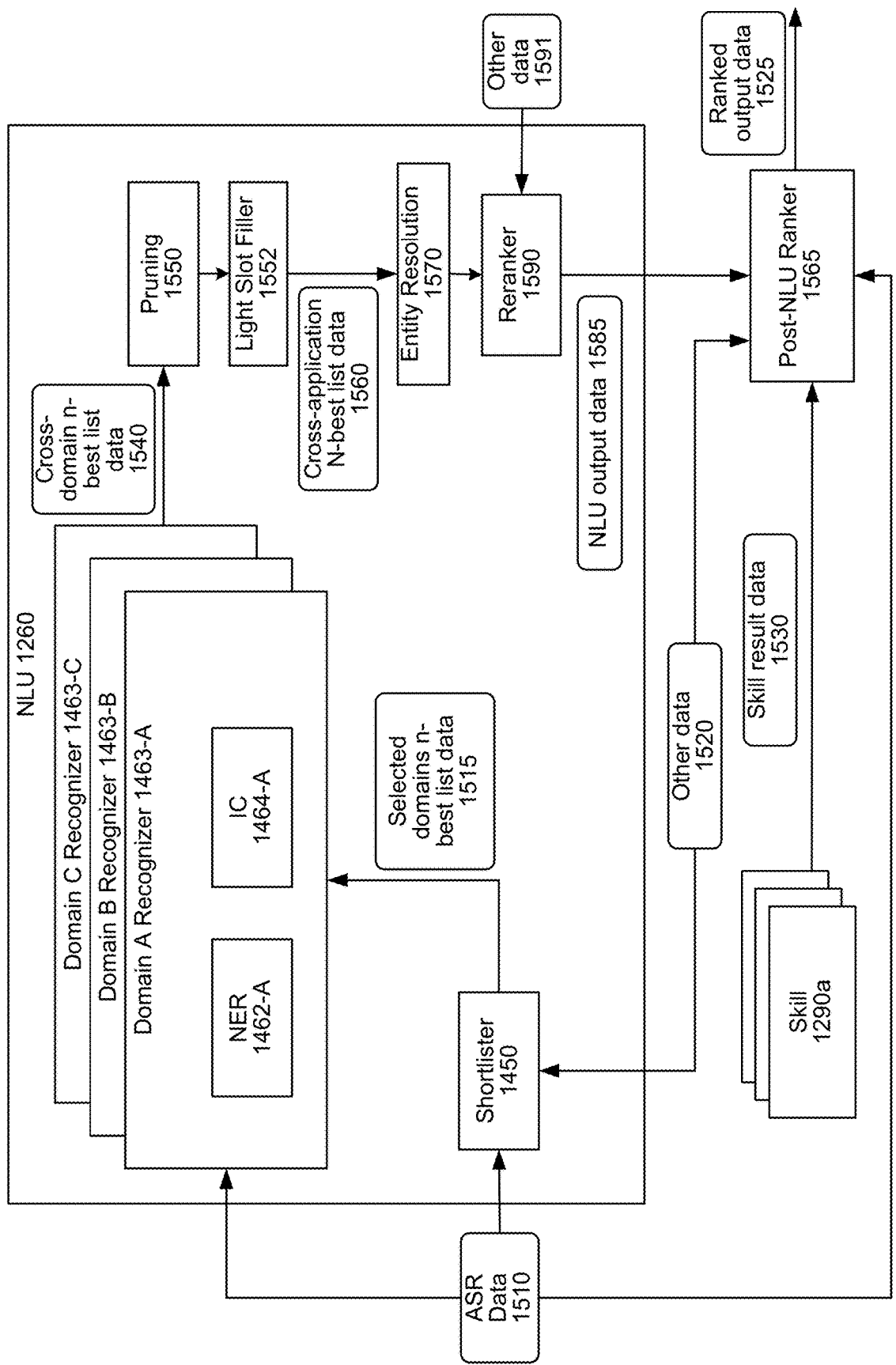
FIG. 15 is a conceptual diagram of how natural language processing is performed, according to embodiments of the present disclosure.

FIGS. 14 and 15 illustrates how the NLU component 1260 may perform NLU processing. FIG. 14 is a conceptual diagram of how natural language processing is performed, according to embodiments of the present disclosure. And FIG. 15 is a conceptual diagram of how natural language processing is performed, according to embodiments of the present disclosure.

FIG. 14 illustrates how NLU processing is performed on text data. The NLU component 1260 may process text data including several ASR hypotheses of a single user input. For example, if the ASR component 1250 outputs text data including an n-best list of ASR hypotheses, the NLU component 1260 may process the text data with respect to all (or a portion of) the ASR hypotheses represented therein.

The NLU component 1260 may annotate text data by parsing and/or tagging the text data. For example, for the text data "tell me the weather for Seattle," the NLU component 1260 may tag "tell me the weather for Seattle" as an <OutputWeather> intent as well as separately tag "Seattle" as a location for the weather information.

The NLU component 1260 may include a shortlister component 1450. The shortlister component 1450 selects skills that may execute with respect to ASR output data 1510 input to the NLU component 1260 (e.g., applications that may execute with respect to the user input). The ASR output data 1510 (which may also be referred to as ASR output data 1510) may include representations of text of an utterance, such as words, subword units, or the like. The shortlister component 1450 thus limits downstream, more resource intensive NLU processes to being performed with respect to skills that may execute with respect to the user input.

Without a shortlister component 1450, the NLU component 1260 may process ASR output data 1510 input thereto with respect to every skill of the system, either in parallel, in series, or using some combination thereof. By implementing a shortlister component 1450, the NLU component 1260 may process ASR output data 1510 with respect to only the skills that may execute with respect to the user input. This reduces total compute power and latency attributed to NLU processing.

The shortlister component 1450 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1450 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1450 may be trained with respect to a different skill. Alternatively, the shortlister component 1450 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 1450. For example, some sample user inputs may be positive examples (e.g., user inputs that may be used to invoke the skill). Other sample user inputs may be negative examples (e.g., user inputs that may not be used to invoke the skill).

As described above, the shortlister component 1450 may include a different trained model for each skill of the system, a different trained model for each domain, or some other combination of trained model(s). For example, the shortlister component 1450 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1450 to output indications of only a portion of the skills that the ASR output data 1510 may relate to. For example, a user input may correspond to "tell me about Tom Collins." If the model is clustered based on domain, the shortlister component 1450 may determine the user input corresponds to a recipe skill (e.g., a drink recipe) even though the user input may also correspond to an information skill (e.g., including information about a person named Tom Collins).

The NLU component 1260 may include one or more recognizers 1463. In at least some embodiments, a recognizer 1463 may be associated with a skill support system 125 (e.g., the recognizer may be configured to interpret text data to correspond to the skill support system 125). In at least some other examples, a recognizer 1463 may be associated with a domain such as smart home, video, music, weather, custom, etc. (e.g., the recognizer may be configured to interpret text data to correspond to the domain).

If the shortlister component 1450 determines ASR output data 1510 is potentially associated with multiple domains, the recognizers 1463 associated with the domains may process the ASR output data 1510, while recognizers 1463 not indicated in the shortlister component 1450's output may not process the ASR output data 1510. The "shortlisted" recognizers 1463 may process the ASR output data 1510 in parallel, in series, partially in parallel, etc. For example, if ASR output data 1510 potentially relates to both a communications domain and a music domain, a recognizer associated with the communications domain may process the ASR output data 1510 in parallel, or partially in parallel, with a recognizer associated with the music domain processing the ASR output data 1510.

Each recognizer 1463 may include a named entity recognition (NER) component 1462. The NER component 1462 attempts to identify grammars and lexical information that may be used to construe meaning with respect to text data input therein. The NER component 1462 identifies portions of text data that correspond to a named entity associated with a domain, associated with the recognizer 1463 implementing the NER component 1462. The NER component 1462 (or other component of the NLU component 1260) may also determine whether a word refers to an entity whose identity is not explicitly mentioned in the text data, for example "him," "her," "it" or other anaphora, exophora, or the like.

Each recognizer 1463, and more specifically each NER component 1462, may be associated with a particular grammar database 1476, a particular set of intents/actions 1474, and a particular personalized lexicon 1486. The grammar databases 1476, and intents/actions 1474 may be stored in an NLU storage 1473. Each gazetteer 1484 may include domain/skill-indexed lexical information associated with a particular user and/or device 110. For example, a Gazetteer A (1484a) includes skill-indexed lexical information 1486aa to 1486an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1462 applies grammar information 1476 and lexical information 1486 associated with a domain (associated with the recognizer 1463 implementing the NER component 1462) to determine a mention of one or more entities in text data. In this manner, the NER component 1462 identifies "slots" (each corresponding to one or more particular words in text data) that may be useful for later processing. The NER component 1462 may also label each slot with a type (e.g., noun, place, city, artist name, song name, etc.).

Each grammar database 1476 includes the names of entities (i.e., nouns) commonly found in speech about the particular domain to which the grammar database 1476 relates, whereas the lexical information 1486 is personalized to the user and/or the device 110 from which the user input originated. For example, a grammar database 1476 associated with a shopping domain may include a database of words commonly used when people discuss shopping.

A downstream process called entity resolution (discussed in detail elsewhere herein) links a slot of text data to a specific entity known to the system. To perform entity resolution, the NLU component 1260 may utilize gazetteer information (1484a-1484n) stored in an entity library storage 1482. The gazetteer information 1484 may be used to match text data (representing a portion of the user input) with text data representing known entities, such as song titles, contact names, etc. Gazetteers 1484 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1463 may also include an intent classification (IC) component 1464. An IC component 1464 parses text data to determine an intent(s) (associated with the domain associated with the recognizer 1463 implementing the IC component 1464) that potentially represents the user input. An intent represents to an action a user desires be performed. An IC component 1464 may communicate with a database 1474 of words linked to intents. For example, a music intent database may link words and phrases such as "quiet," "volume off," and "mute" to a <Mute> intent. An IC component 1464 identifies potential intents by comparing words and phrases in text data (representing at least a portion of the user input) to the words and phrases in an intents database 1474 (associated with the domain that is associated with the recognizer 1463 implementing the IC component 1464).

The intents identifiable by a specific IC component 1464 are linked to domain-specific (i.e., the domain associated with the recognizer 1463 implementing the IC component 1464) grammar frameworks 1476 with "slots" to be filled. Each slot of a grammar framework 1476 corresponds to a portion of text data that the system believes corresponds to an entity. For example, a grammar framework 1476 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1476 may not be structured as sentences, but rather based on associating slots with grammatical tags.

For example, an NER component 1462 may parse text data to identify words as subject, object, verb, preposition, etc. based on grammar rules and/or models prior to recognizing named entities in the text data. An IC component 1464 (implemented by the same recognizer 1463 as the NER component 1462) may use the identified verb to identify an intent. The NER component 1462 may then determine a grammar model 1476 associated with the identified intent. For example, a grammar model 1476 for an intent corresponding to <PlayMusic> may specify a list of slots applicable to play the identified "object" and any object modifier (e.g., a prepositional phrase), such as {Artist Name}, {Album Name}, {Song name}, etc. The NER component 1462 may then search corresponding fields in a lexicon 1486 (associated with the domain associated with the recognizer 1463 implementing the NER component 1462), attempting to match words and phrases in text data the NER component 1462 previously tagged as a grammatical object or object modifier with those identified in the lexicon 1486.

An NER component 1462 may perform semantic tagging, which is the labeling of a word or combination of words according to their type/semantic meaning. An NER component 1462 may parse text data using heuristic grammar rules, or a model may be constructed using techniques such as Hidden Markov Models, maximum entropy models, log linear models, conditional random fields (CRF), and the like. For example, an NER component 1462 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1462 identifies "Play" as a verb based on a word database associated with the music domain, which an IC component 1464 (also implemented by the music domain recognizer) may determine corresponds to a <PlayMusic> intent. At this stage, no determination has been made as to the meaning of "mother's little helper" or "the rolling stones," but based on grammar rules and models, the NER component 1462 has determined the text of these phrases relates to the grammatical object (i.e., entity) of the user input represented in the text data.

An NER component 1462 may tag text data to attribute meaning thereto. For example, an NER component 1462 may tag "play mother's little helper by the rolling stones" as: {domain} Music, {intent}<PlayMusic>, {artist name} rolling stones, {media type} SONG, and {song title} mother's little helper. For further example, the NER component 1462 may tag "play songs by the rolling stones" as: {domain} Music, {intent}<PlayMusic>, {artist name} rolling stones, and {media type} SONG.

The shortlister component 1450 may receive ASR output data 1510 output from the ASR component 1250 or output from the device 110 (as illustrated in FIG. 12). The ASR component 1250 may embed the ASR output data 1510 into a form processable by a trained model(s) using sentence embedding techniques as known in the art. Sentence embedding results in the ASR output data 1510 including text in a structure that enables the trained models of the shortlister component 1450 to operate on the ASR output data 1510. For example, an embedding of the ASR output data 1510 may be a vector representation of the ASR output data 1510.

The shortlister component 1450 may make binary determinations (e.g., yes or no) regarding which domains relate to the ASR output data 1510. The shortlister component 1450 may make such determinations using the one or more trained models described herein above. If the shortlister component 1450 implements a single trained model for each domain, the shortlister component 1450 may simply run the models that are associated with enabled domains as indicated in a user profile associated with the device 110 and/or user that originated the user input.

The shortlister component 1450 may generate n-best list data 1515 representing domains that may execute with respect to the user input represented in the ASR output data 1510. The size of the n-best list represented in the n-best list data 1515 is configurable. In an example, the n-best list data 1515 may indicate every domain of the system as well as contain an indication, for each domain, regarding whether the domain is likely capable to execute the user input represented in the ASR output data 1510. In another example, instead of indicating every domain of the system, the n-best list data 1515 may only indicate the domains that are likely to be able to execute the user input represented in the ASR output data 1510. In yet another example, the shortlister component 1450 may implement thresholding such that the n-best list data 1515 may indicate no more than a maximum number of domains that may execute the user input represented in the ASR output data 1510. In an example, the threshold number of domains that may be represented in the n-best list data 1515 is ten. In another example, the domains included in the n-best list data 1515 may be limited by a threshold a score, where only domains indicating a likelihood to handle the user input is above a certain score (as determined by processing the ASR output data 1510 by the shortlister component 1450 relative to such domains) are included in the n-best list data 1515.

The ASR output data 1510 may correspond to more than one ASR hypothesis. When this occurs, the shortlister component 1450 may output a different n-best list (represented in the n-best list data 1515) for each ASR hypothesis. Alternatively, the shortlister component 1450 may output a single n-best list representing the domains that are related to the multiple ASR hypotheses represented in the ASR output data 1510.

As indicated above, the shortlister component 1450 may implement thresholding such that an n-best list output therefrom may include no more than a threshold number of entries. If the ASR output data 1510 includes more than one ASR hypothesis, the n-best list output by the shortlister component 1450 may include no more than a threshold number of entries irrespective of the number of ASR hypotheses output by the ASR component 1250. Alternatively or in addition, the n-best list output by the shortlister component 1450 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1510, the shortlister component 1450 may generate confidence scores representing likelihoods that domains relate to the ASR output data 1510. If the shortlister component 1450 implements a different trained model for each domain, the shortlister component 1450 may generate a different confidence score for each individual domain trained model that is run. If the shortlister component 1450 runs the models of every domain when ASR output data 1510 is received, the shortlister component 1450 may generate a different confidence score for each domain of the system. If the shortlister component 1450 runs the models of only the domains that are associated with skills indicated as enabled in a user profile associated with the device 110 and/or user that originated the user input, the shortlister component 1450 may only generate a different confidence score for each domain associated with at least one enabled skill. If the shortlister component 1450 implements a single trained model with domain specifically trained portions, the shortlister component 1450 may generate a different confidence score for each domain who's specifically trained portion is run. The shortlister component 1450 may perform matrix vector modification to obtain confidence scores for all domains of the system in a single instance of processing of the ASR output data 1510.

N-best list data 1515 including confidence scores that may be output by the shortlister component 1450 may be represented as, for example:

Search domain, 0.67
Recipe domain, 0.62
Information domain, 0.57
Shopping domain, 0.42

As indicated, the confidence scores output by the shortlister component 1450 may be numeric values. The confidence scores output by the shortlister component 1450 may alternatively be binned values (e.g., high, medium, low).

The n-best list may only include entries for domains having a confidence score satisfying (e.g., equaling or exceeding) a minimum threshold confidence score. Alternatively, the shortlister component 1450 may include entries for all domains associated with user enabled skills, even if one or more of the domains are associated with confidence scores that do not satisfy the minimum threshold confidence score.

The shortlister component 1450 may consider other data 1520 when determining which domains may relate to the user input represented in the ASR output data 1510 as well as respective confidence scores. The other data 1520 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1520 may include an indicator of the user associated with the ASR output data 1510, for example as determined by a user recognition component.

The other data 1520 may be character embedded prior to being input to the shortlister component 1450. The other data 1520 may alternatively be embedded using other techniques known in the art prior to being input to the shortlister component 1450.

The other data 1520 may also include data indicating the domains associated with skills that are enabled with respect to the device 110 and/or user that originated the user input. The shortlister component 1450 may use such data to determine which domain-specific trained models to run. That is, the shortlister component 1450 may determine to only run the trained models associated with domains that are associated with user-enabled skills. The shortlister component 1450 may alternatively use such data to alter confidence scores of domains.

As an example, considering two domains, a first domain associated with at least one enabled skill and a second domain not associated with any user-enabled skills of the user that originated the user input, the shortlister component 1450 may run a first model specific to the first domain as well as a second model specific to the second domain. Alternatively, the shortlister component 1450 may run a model configured to determine a score for each of the first and second domains. The shortlister component 1450 may determine a same confidence score for each of the first and second domains in the first instance. The shortlister component 1450 may then alter those confidence scores based on which domains is associated with at least one skill enabled by the present user. For example, the shortlister component 1450 may increase the confidence score associated with the domain associated with at least one enabled skill while leaving the confidence score associated with the other domain the same. Alternatively, the shortlister component 1450 may leave the confidence score associated with the domain associated with at least one enabled skill the same while decreasing the confidence score associated with the other domain. Moreover, the shortlister component 1450 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 1270. When the shortlister component 1450 receives the ASR output data 1510, the shortlister component 1450 may determine whether profile data associated with the user and/or device 110 that originated the command includes an indication of enabled skills.

The other data 1520 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1450 may use such data to determine which domain-specific trained models to run. For example, if the device 110 corresponds to a displayless type device, the shortlister component 1450 may determine not to run trained models specific to domains that output video data. The shortlister component 1450 may alternatively use such data to alter confidence scores of domains.

As an example, considering two domains, one that outputs audio data and another that outputs video data, the shortlister component 1450 may run a first model specific to the domain that generates audio data as well as a second model specific to the domain that generates video data. Alternatively the shortlister component 1450 may run a model configured to determine a score for each domain. The shortlister component 1450 may determine a same confidence score for each of the domains in the first instance. The shortlister component 1450 may then alter the original confidence scores based on the type of the device 110 that originated the user input corresponding to the ASR output data 1510. For example, if the device 110 is a displayless device, the shortlister component 1450 may increase the confidence score associated with the domain that generates audio data while leaving the confidence score associated with the domain that generates video data the same. Alternatively, if the device 110 is a displayless device, the shortlister component 1450 may leave the confidence score associated with the domain that generates audio data the same while decreasing the confidence score associated with the domain that generates video data. Moreover, if the device 110 is a displayless device, the shortlister component 1450 may increase the confidence score associated with the domain that generates audio data as well as decrease the confidence score associated with the domain that generates video data.

The type of device information represented in the other data 1520 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1520 may represent the smart TV of other display device, and not the displayless device that captured the spoken user input.

The other data 1520 may also include data indicating the user input originating device's speed, location, or other mobility information. For example, the device may correspond to a vehicle including a display. If the vehicle is moving, the shortlister component 1450 may decrease the confidence score associated with a domain that generates video data as it may be undesirable to output video content to a user while the user is driving. The device may output data to the system(s) 120 indicating when the device is moving.

The other data 1520 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1450 may use such data to alter confidence scores of domains. For example, the shortlister component 1450 may run a first model specific to a first domain as well as a second model specific to a second domain. Alternatively, the shortlister component 1450 may run a model configured to determine a score for each domain. The shortlister component 1450 may also determine a same confidence score for each of the domains in the first instance. The shortlister component 1450 may then alter the original confidence scores based on the first domain being invoked to cause the system to output content while the current user input was received. Based on the first domain being invoked, the shortlister component 1450 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1515 generated by the shortlister component 1450 as well as the different types of other data 1520 considered by the shortlister component 1450 are configurable. For example, the shortlister component 1450 may update confidence scores as more other data 1520 is considered. For further example, the n-best list data 1515 may exclude relevant domains if thresholding is implemented. Thus, for example, the shortlister component 1450 may include an indication of a domain in the n-best list data 1515 unless the shortlister component 1450 is one hundred percent confident that the domain may not execute the user input represented in the ASR output data 1510 (e.g., the shortlister component 1450 determines a confidence score of zero for the domain).

The shortlister component 1450 may send the ASR output data 1510 to recognizers 1463 associated with domains represented in the n-best list data 1515. Alternatively, the shortlister component 1450 may send the n-best list data 1515 or some other indicator of the selected subset of domains to another component (such as the orchestrator component 1230) which may in turn send the ASR output data 1510 to the recognizers 1463 corresponding to the domains included in the n-best list data 1515 or otherwise indicated in the indicator. If the shortlister component 1450 generates an n-best list representing domains without any associated confidence scores, the shortlister component 1450/orchestrator component 1230 may send the ASR output data 1510 to recognizers 1463 associated with domains that the shortlister component 1450 determines may execute the user input. If the shortlister component 1450 generates an n-best list representing domains with associated confidence scores, the shortlister component 1450/orchestrator component 1230 may send the ASR output data 1510 to recognizers 1463 associated with domains associated with confidence scores satisfying (e.g., meeting or exceeding) a threshold minimum confidence score.

A recognizer 1463 may output tagged text data generated by an NER component 1462 and an IC component 1464, as described herein above. The NLU component 1260 may compile the output tagged text data of the recognizers 1463 into a single cross-domain n-best list data 1540 and may send the cross-domain n-best list data 1540 to a pruning component 1550. Each entry of tagged text (e.g., each NLU hypothesis) represented in the cross-domain n-best list data

1540 may be associated with a respective score indicating a likelihood that the NLU hypothesis corresponds to the domain associated with the recognizer 1463 from which the NLU hypothesis was output. For example, the cross-domain n-best list data 1540 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1550 may sort the NLU hypotheses represented in the cross-domain n-best list data 1540 according to their respective scores. The pruning component 1550 may perform score thresholding with respect to the cross-domain NLU hypotheses. For example, the pruning component 1550 may select NLU hypotheses associated with scores satisfying (e.g., meeting and/or exceeding) a threshold score. The pruning component 1550 may also or alternatively perform number of NLU hypothesis thresholding. For example, the pruning component 1550 may select the top scoring NLU hypothesis(es). The pruning component 1550 may output a portion of the NLU hypotheses input thereto. The purpose of the pruning component 1550 is to create a reduced list of NLU hypotheses so that downstream, more resource intensive, processes may only operate on the NLU hypotheses that most likely represent the user's intent.

The NLU component 1260 may include a light slot filler component 1552. The light slot filler component 1552 can take text from slots represented in the NLU hypotheses output by the pruning component 1550 and alter them to make the text more easily processed by downstream components. The light slot filler component 1552 may perform low latency operations that do not involve heavy operations such as reference to a knowledge base (e.g., 1472. The purpose of the light slot filler component 1552 is to replace words with other words or values that may be more easily understood by downstream components. For example, if a NLU hypothesis includes the word "tomorrow," the light slot filler component 1552 may replace the word "tomorrow" with an actual date for purposes of downstream processing. Similarly, the light slot filler component 1552 may replace the word "CD" with "album" or the words "compact disc." The replaced words are then included in the cross-domain n-best list data 1560.

The cross-domain n-best list data 1560 may be input to an entity resolution component 1570. The entity resolution component 1570 can apply rules or other instructions to standardize labels or tokens from previous stages into an intent/slot representation. The precise transformation may depend on the domain. For example, for a travel domain, the entity resolution component 1570 may transform text corresponding to "Boston airport" to the standard BOS three-letter code referring to the airport. The entity resolution component 1570 can refer to a knowledge base (e.g., 1472) that is used to specifically identify the precise entity referred to in each slot of each NLU hypothesis represented in the cross-domain n-best list data 1560. Specific intent/slot combinations may also be tied to a particular source, which may then be used to resolve the text. In the example "play songs by the stones," the entity resolution component 1570 may reference a personal music catalog, Amazon Music account, a user profile, or the like. The entity resolution component 1570 may output an altered n-best list that is based on the cross-domain n-best list data 1560 but that includes more detailed information (e.g., entity IDs) about the specific entities mentioned in the slots and/or more detailed slot data that can eventually be used by a skill. The NLU component 1260 may include multiple entity resolution components 1570 and each entity resolution component 1570 may be specific to one or more domains.

The NLU component 1260 may include a reranker 1590. The reranker 1590 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1570.

The reranker 1590 may apply re-scoring, biasing, or other techniques. The reranker 1590 may consider not only the data output by the entity resolution component 1570, but may also consider other data 1591. The other data 1591 may include a variety of information. For example, the other data 1591 may include skill rating or popularity data. For example, if one skill has a high rating, the reranker 1590 may increase the score of a NLU hypothesis that may be processed by the skill. The other data 1591 may also include information about skills that have been enabled by the user that originated the user input. For example, the reranker 1590 may assign higher scores to NLU hypothesis that may be processed by enabled skills than NLU hypothesis that may be processed by non-enabled skills. The other data 1591 may also include data indicating user usage history, such as if the user that originated the user input regularly uses a particular skill or does so at particular times of day. The other data 1591 may additionally include data indicating date, time, location, weather, type of device 110, user identifier, context, as well as other information. For example, the reranker 1590 may consider when any particular skill is currently active (e.g., music being played, a game being played, etc.).

As illustrated and described, the entity resolution component 1570 is implemented prior to the reranker 1590. The entity resolution component 1570 may alternatively be implemented after the reranker 1590. Implementing the entity resolution component 1570 after the reranker 1590 limits the NLU hypotheses processed by the entity resolution component 1570 to only those hypotheses that successfully pass through the reranker 1590.

The reranker 1590 may be a global reranker (e.g., one that is not specific to any particular domain). Alternatively, the NLU component 1260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 1260 may perform NLU processing described above with respect to domains associated with skills wholly implemented as part of the system(s) 120 (e.g., designated 1290 in FIG. 12). The NLU component 1260 may separately perform NLU processing described above with respect to domains associated with skills that are at least partially implemented as part of the skill system(s) 125. In an example, the shortlister component 1450 may only process with respect to these latter domains. Results of these two NLU processing paths may be merged into NLU results data 1585, which may be sent to a post-NLU ranker 1565, which may be implemented by the system(s) 120.

The post-NLU ranker 1565 may include a statistical component that produces a ranked list of intent/skill pairs with associated confidence scores. Each confidence score may indicate an adequacy of the skill's execution of the intent with respect to NLU results data associated with the skill. The post-NLU ranker 1565 may operate one or more trained models configured to process the NLU results data 1585, skill result data 1530, and the other data 1520 in order to output ranked output data 1525. The ranked output data 1525 may include an n-best list where the NLU hypotheses in the NLU results data 1585 are reordered such that the n-best list in the ranked output data 1525 represents a prioritized list of skills to respond to a user input as determined by the post-NLU ranker 1565. The ranked output data 1525 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1565 enables the system to better determine the best skill to execute the user input. For example, first and second NLU hypotheses in the NLU results data 1585 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1565 (or other scheduling component such as orchestrator component 1230) may solicit the first skill and the second skill to provide potential result data 1530 based on the first NLU hypothesis and the second NLU hypothesis, respectively. For example, the post-NLU ranker 1565 may send the first NLU hypothesis to the first skill 1290a along with a request for the first skill 1290a to at least partially execute with respect to the first NLU hypothesis. The post-NLU ranker 1565 may also send the second NLU hypothesis to the second skill 1290b along with a request for the second skill 1290b to at least partially execute with respect to the second NLU hypothesis. The post-NLU ranker 1565 receives, from the first skill 1290a, first result data 1530a generated from the first skill 1290a's execution with respect to the first NLU hypothesis. The post-NLU ranker 1565 also receives, from the second skill 1290b, second results data 1530b generated from the second skill 1290b's execution with respect to the second NLU hypothesis.

The result data 1530 may include various portions. For example, the result data 1530 may include content (e.g., audio data, text data, and/or video data) to be output to a user. The result data 1530 may also include a unique identifier used by the system(s) 120 and/or the skill system(s) 125 to locate the data to be output to a user. The result data 1530 may also include an instruction. For example, if the user input corresponds to "turn on the light," the result data 1530 may include an instruction causing the system to turn on a light associated with a profile of the device 110 and/or user.

The post-NLU ranker 1565 may consider the first result data 1530a and the second result data 1530b to alter the first confidence score and the second confidence score of the first NLU hypothesis and the second NLU hypothesis, respectively. That is, the post-NLU ranker 1565 may generate a third confidence score based on the first result data 1530a and the first confidence score. The third confidence score may correspond to how likely the post-NLU ranker 1565 determines the first skill will correctly respond to the user input. The post-NLU ranker 1565 may also generate a fourth confidence score based on the second result data 1530b and the second confidence score. One skilled in the art will appreciate that a first difference between the third confidence score and the fourth confidence score may be greater than a second difference between the first confidence score and the second confidence score. The post-NLU ranker 1565 may also consider the other data 1520 to generate the third confidence score and the fourth confidence score. While it has been described that the post-NLU ranker 1565 may alter the confidence scores associated with first and second NLU hypotheses, one skilled in the art will appreciate that the post-NLU ranker 1565 may alter the confidence scores of more than two NLU hypotheses. The post-NLU ranker 1565 may select the result data 1530 associated with the skill 1290 with the highest altered confidence score to be the data output in response to the current user input. The post-NLU ranker 1565 may also consider the ASR output data 1510 to alter the NLU hypotheses confidence scores.

The orchestrator component 1230 may, prior to sending the NLU results data 1585 to the post-NLU ranker 1565, associate intents in the NLU hypotheses with skills 1290. For example, if a NLU hypothesis includes a <PlayMusic> intent, the orchestrator component 1230 may associate the NLU hypothesis with one or more skills 1290 that can execute the <PlayMusic> intent. Thus, the orchestrator component 1230 may send the NLU results data 1585, including NLU hypotheses paired with skills 1290, to the post-NLU ranker 1565. In response to ASR output data 1510 corresponding to "what should I do for dinner today," the orchestrator component 1230 may generates pairs of skills 1290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 1565 queries each skill 1290, paired with a NLU hypothesis in the NLU results data 1585, to provide result data 1530 based on the NLU hypothesis with which it is associated. That is, with respect to each skill, the post-NLU ranker 1565 colloquially asks the each skill "if given this NLU hypothesis, what would you do with it." According to the above example, the post-NLU ranker 1565 may send skills 1290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 1565 may query each of the skills 1290 in parallel or substantially in parallel.

A skill 1290 may provide the post-NLU ranker 1565 with various data and indications in response to the post-NLU ranker 1565 soliciting the skill 1290 for result data 1530. A skill 1290 may simply provide the post-NLU ranker 1565 with an indication of whether or not the skill can execute with respect to the NLU hypothesis it received. A skill 1290 may also or alternatively provide the post-NLU ranker 1565 with output data generated based on the NLU hypothesis it received. In some situations, a skill 1290 may need further information in addition to what is represented in the received NLU hypothesis to provide output data responsive to the user input. In these situations, the skill 1290 may provide the post-NLU ranker 1565 with result data 1530 indicating slots of a framework that the skill 1290 further needs filled or entities that the skill 1290 further needs resolved prior to the skill 1290 being able to provided result data 1530 responsive to the user input. The skill 1290 may also provide the post-NLU ranker 1565 with an instruction and/or computer-generated speech indicating how the skill 1290 recommends the system solicit further information needed by the skill 1290. The skill 1290 may further provide the post-NLU ranker 1565 with an indication of whether the skill 1290 will have all needed information after the user provides additional information a single time, or whether the skill 1290 will need the user to provide various kinds of additional information prior to the skill 1290 having all needed information. According to the above example, skills 1290 may provide the post-NLU ranker 1565 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1530 includes an indication provided by a skill 1290 indicating whether or not the skill 1290 can execute with respect to a NLU hypothesis; data generated by a skill 1290 based on a NLU hypothesis; as well as an indication provided by a skill 1290 indicating the skill 1290 needs further information in addition to what is represented in the received NLU hypothesis.

The post-NLU ranker 1565 uses the result data 1530 provided by the skills 1290 to alter the NLU processing confidence scores generated by the reranker 1590. That is, the post-NLU ranker 1565 uses the result data 1530 provided by the queried skills 1290 to create larger differences between the NLU processing confidence scores generated by the reranker 1590. Without the post-NLU ranker 1565, the system may not be confident enough to determine an output in response to a user input, for example when the NLU hypotheses associated with multiple skills are too close for the system to confidently determine a single skill 1290 to invoke to respond to the user input. For example, if the system does not implement the post-NLU ranker 1565, the system may not be able to determine whether to obtain output data from a general reference information skill or a medical information skill in response to a user input corresponding to "what is acne."

The post-NLU ranker 1565 may prefer skills 1290 that provide result data 1530 responsive to NLU hypotheses over skills 1290 that provide result data 1530 corresponding to an indication that further information is needed, as well as skills 1290 that provide result data 1530 indicating they can provide multiple responses to received NLU hypotheses. For example, the post-NLU ranker 1565 may generate a first score for a first skill 1290a that is greater than the first skill's NLU confidence score based on the first skill 1290a providing result data 1530a including a response to a NLU hypothesis. For further example, the post-NLU ranker 1565 may generate a second score for a second skill 1290b that is less than the second skill's NLU confidence score based on the second skill 1290b providing result data 1530b indicating further information is needed for the second skill 1290b to provide a response to a NLU hypothesis. Yet further, for example, the post-NLU ranker 1565 may generate a third score for a third skill 1290c that is less than the third skill's NLU confidence score based on the third skill 1290c providing result data 1530c indicating the third skill 1290c can provide multiple responses to a NLU hypothesis.

The post-NLU ranker 1565 may consider other data 1520 in determining scores. The other data 1520 may include rankings associated with the queried skills 1290. A ranking may be a system ranking or a user-specific ranking. A ranking may indicate a veracity of a skill from the perspective of one or more users of the system. For example, the post-NLU ranker 1565 may generate a first score for a first skill 1290a that is greater than the first skill's NLU processing confidence score based on the first skill 1290a being associated with a high ranking. For further example, the post-NLU ranker 1565 may generate a second score for a second skill 1290b that is less than the second skill's NLU processing confidence score based on the second skill 1290b being associated with a low ranking.

The other data 1520 may include information indicating whether or not the user that originated the user input has enabled one or more of the queried skills 1290. For example, the post-NLU ranker 1565 may generate a first score for a first skill 1290a that is greater than the first skill's NLU processing confidence score based on the first skill 1290a being enabled by the user that originated the user input. For further example, the post-NLU ranker 1565 may generate a second score for a second skill 1290b that is less than the second skill's NLU processing confidence score based on the second skill 1290b not being enabled by the user that originated the user input. When the post-NLU ranker 1565 receives the NLU results data 1585, the post-NLU ranker 1565 may determine whether profile data, associated with the user and/or device that originated the user input, includes indications of enabled skills.

The other data 1520 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1565 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1565 may increase the NLU processing confidence score associated with a first skill configured to output visual data and/or decrease the NLU processing confidence score associated with a second skill configured to output audio data.

The other data 1520 may include information indicating the veracity of the result data 1530 provided by a skill 1290. For example, if a user says "tell me a recipe for pasta sauce," a first skill 1290a may provide the post-NLU ranker 1565 with first result data 1530a corresponding to a first recipe associated with a five star rating and a second skill 1290b may provide the post-NLU ranker 1565 with second result data 1530b corresponding to a second recipe associated with a one star rating. In this situation, the post-NLU ranker 1565 may increase the NLU processing confidence score associated with the first skill 1290*a* based on the first skill 1290*a* providing the first result data 1530*a* associated with the five star rating and/or decrease the NLU processing confidence score associated with the second skill 1290*b* based on the second skill 1290*b* providing the second result data 1530*b* associated with the one star rating.

The other data 1520 may include information indicating the type of device that originated the user input. For example, the device may correspond to a "hotel room" type if the device is located in a hotel room. If a user inputs a command corresponding to "order me food" to the device located in the hotel room, the post-NLU ranker 1565 may increase the NLU processing confidence score associated with a first skill 1290*a* corresponding to a room service skill associated with the hotel and/or decrease the NLU processing confidence score associated with a second skill 1290*b* corresponding to a food skill not associated with the hotel.

The other data 1520 may include information indicating a location of the device and/or user that originated the user input. The system may be configured with skills 1290 that may only operate with respect to certain geographic locations. For example, a user may provide a user input corresponding to "when is the next train to Portland." A first skill 1290*a* may operate with respect to trains that arrive at, depart from, and pass through Portland, Oregon. A second skill 1290*b* may operate with respect to trains that arrive at, depart from, and pass through Portland, Maine. If the device and/or user that originated the user input is located in Seattle, Washington, the post-NLU ranker 1565 may increase the NLU processing confidence score associated with the first skill 1290*a* and/or decrease the NLU processing confidence score associated with the second skill 1290*b*. Likewise, if the device and/or user that originated the user input is located in Boston, Massachusetts, the post-NLU ranker 1565 may increase the NLU processing confidence score associated with the second skill 1290*b* and/or decrease the NLU processing confidence score associated with the first skill 1290*a*.

The other data 1520 may include information indicating a time of day. The system may be configured with skills 1290 that operate with respect to certain times of day. For example, a user may provide a user input corresponding to "order me food." A first skill 1290*a* may generate first result data 1530*a* corresponding to breakfast. A second skill 1290*b* may generate second result data 1530*b* corresponding to dinner. If the system(s) 120 receives the user input in the morning, the post-NLU ranker 1565 may increase the NLU processing confidence score associated with the first skill 1290*a* and/or decrease the NLU processing score associated with the second skill 1290*b*. If the system(s) 120 receives the user input in the afternoon or evening, the post-NLU ranker 1565 may increase the NLU processing confidence score associated with the second skill 1290*b* and/or decrease the NLU processing confidence score associated with the first skill 1290*a*.

The other data 1520 may include information indicating user preferences. The system may include multiple skills 1290 configured to execute in substantially the same manner. For example, a first skill 1290*a* and a second skill 1290*b* may both be configured to order food from respective restaurants. The system may store a user preference (e.g., in the profile storage 1270) that is associated with the user that provided the user input to the system(s) 120 as well as indicates the user prefers the first skill 1290*a* over the second skill 1290*b*. Thus, when the user provides a user input that may be executed by both the first skill 1290*a* and the second skill 1290*b*, the post-NLU ranker 1565 may increase the NLU processing confidence score associated with the first skill 1290*a* and/or decrease the NLU processing confidence score associated with the second skill 1290*b*.

The other data 1520 may include information indicating system usage history associated with the user that originated the user input. For example, the system usage history may indicate the user originates user inputs that invoke a first skill 1290*a* more often than the user originates user inputs that invoke a second skill 1290*b*. Based on this, if the present user input may be executed by both the first skill 1290*a* and the second skill 1290*b*, the post-NLU ranker 1565 may increase the NLU processing confidence score associated with the first skill 1290*a* and/or decrease the NLU processing confidence score associated with the second skill 1290*b*.

The other data 1520 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 1565 may increase the NLU processing confidence score associated with a first skill 1290*a* that generates audio data. The post-NLU ranker 1565 may also or alternatively decrease the NLU processing confidence score associated with a second skill 1290*b* that generates image data or video data.

The other data 1520 may include information indicating how long it took a skill 1290 to provide result data 1530 to the post-NLU ranker 1565. When the post-NLU ranker 1565 multiple skills 1290 for result data 1530, the skills 1290 may respond to the queries at different speeds. The post-NLU ranker 1565 may implement a latency budget. For example, if the post-NLU ranker 1565 determines a skill 1290 responds to the post-NLU ranker 1565 within a threshold amount of time from receiving a query from the post-NLU ranker 1565, the post-NLU ranker 1565 may increase the NLU processing confidence score associated with the skill 1290. Conversely, if the post-NLU ranker 1565 determines a skill 1290 does not respond to the post-NLU ranker 1565 within a threshold amount of time from receiving a query from the post-NLU ranker 1565, the post-NLU ranker 1565 may decrease the NLU processing confidence score associated with the skill 1290.

It has been described that the post-NLU ranker 1565 uses the other data 1520 to increase and decrease NLU processing confidence scores associated with various skills 1290 that the post-NLU ranker 1565 has already requested result data from. Alternatively, the post-NLU ranker 1565 may use the other data 1520 to determine which skills 1290 to request result data from. For example, the post-NLU ranker 1565 may use the other data 1520 to increase and/or decrease NLU processing confidence scores associated with skills 1290 associated with the NLU results data 1585 output by the NLU component 1260. The post-NLU ranker 1565 may select n-number of top scoring altered NLU processing confidence scores. The post-NLU ranker 1565 may then request result data 1530 from only the skills 1290 associated with the selected n-number of NLU processing confidence scores.

As described, the post-NLU ranker 1565 may request result data 1530 from all skills 1290 associated with the NLU results data 1585 output by the NLU component 1260.

Alternatively, the system(s) 120 may prefer result data 1530 from skills implemented entirely by the system(s) 120 rather than skills at least partially implemented by the skill system(s) 125. Therefore, in the first instance, the post-NLU ranker 1565 may request result data 1530 from only skills associated with the NLU results data 1585 and entirely implemented by the system(s) 120. The post-NLU ranker 1565 may only request result data 1530 from skills associated with the NLU results data 1585, and at least partially implemented by the skill system(s) 125, if none of the skills, wholly implemented by the system(s) 120, provide the post-NLU ranker 1565 with result data 1530 indicating either data response to the NLU results data 1585, an indication that the skill can execute the user input, or an indication that further information is needed.

As indicated above, the post-NLU ranker 1565 may request result data 1530 from multiple skills 1290. If one of the skills 1290 provides result data 1530 indicating a response to a NLU hypothesis and the other skills provide result data 1530 indicating either they cannot execute or they need further information, the post-NLU ranker 1565 may select the result data 1530 including the response to the NLU hypothesis as the data to be output to the user. If more than one of the skills 1290 provides result data 1530 indicating responses to NLU hypotheses, the post-NLU ranker 1565 may consider the other data 1520 to generate altered NLU processing confidence scores, and select the result data 1530 of the skill associated with the greatest score as the data to be output to the user.

A system that does not implement the post-NLU ranker 1565 may select the highest scored NLU hypothesis in the NLU results data 1585. The system may send the NLU hypothesis to a skill 1290 associated therewith along with a request for output data. In some situations, the skill 1290 may not be able to provide the system with output data. This results in the system indicating to the user that the user input could not be processed even though another skill associated with lower ranked NLU hypothesis could have provided output data responsive to the user input.

The post-NLU ranker 1565 reduces instances of the aforementioned situation. As described, the post-NLU ranker 1565 queries multiple skills associated with the NLU results data 1585 to provide result data 1530 to the post-NLU ranker 1565 prior to the post-NLU ranker 1565 ultimately determining the skill 1290 to be invoked to respond to the user input. Some of the skills 1290 may provide result data 1530 indicating responses to NLU hypotheses while other skills 1290 may providing result data 1530 indicating the skills cannot provide responsive data. Whereas a system not implementing the post-NLU ranker 1565 may select one of the skills 1290 that could not provide a response, the post-NLU ranker 1565 only selects a skill 1290 that provides the post-NLU ranker 1565 with result data corresponding to a response, indicating further information is needed, or indicating multiple responses can be generated.

The post-NLU ranker 1565 may select result data 1530, associated with the skill 1290 associated with the highest score, for output to the user. Alternatively, the post-NLU ranker 1565 may output ranked output data 1525 indicating skills 1290 and their respective post-NLU ranker rankings. Since the post-NLU ranker 1565 receives result data 1530, potentially corresponding to a response to the user input, from the skills 1290 prior to post-NLU ranker 1565 selecting one of the skills or outputting the ranked output data 1525, little to no latency occurs from the time skills provide result data 1530 and the time the system outputs responds to the user.

If the post-NLU ranker 1565 selects result audio data to be output to a user and the system determines content should be output audibly, the post-NLU ranker 1565 (or another component of the system(s) 120) may cause the device 110 to output audio corresponding to the result audio data. If the post-NLU ranker 1565 selects result text data to output to a user and the system determines content should be output visually, the post-NLU ranker 1565 (or another component of the system(s) 120) may cause the device 110 to display text corresponding to the result text data. If the post-NLU ranker 1565 selects result audio data to output to a user and the system determines content should be output visually, the post-NLU ranker 1565 (or another component of the system(s) 120) may send the result audio data to the ASR component 1250. The ASR component 1250 may generate output text data corresponding to the result audio data. The system(s) 120 may then cause the device 110 to display text corresponding to the output text data. If the post-NLU ranker 1565 selects result text data to output to a user and the system determines content should be output audibly, the post-NLU ranker 1565 (or another component of the system(s) 120) may send the result text data to the TTS component 1280. The TTS component 1280 may generate output audio data (corresponding to computer-generated speech) based on the result text data. The system(s) 120 may then cause the device 110 to output audio corresponding to the output audio data.

As described, a skill 1290 may provide result data 1530 either indicating a response to the user input, indicating more information is needed for the skill 1290 to provide a response to the user input, or indicating the skill 1290 cannot provide a response to the user input. If the skill 1290 associated with the highest post-NLU ranker score provides the post-NLU ranker 1565 with result data 1530 indicating a response to the user input, the post-NLU ranker 1565 (or another component of the system(s) 120, such as the orchestrator component 1230) may simply cause content corresponding to the result data 1530 to be output to the user. For example, the post-NLU ranker 1565 may send the result data 1530 to the orchestrator component 1230. The orchestrator component 1230 may cause the result data 1530 to be sent to the device 110, which may output audio and/or display text corresponding to the result data 1530. The orchestrator component 1230 may send the result data 1530 to the ASR component 1250 to generate output text data and/or may send the result data 1530 to the TTS component 1280 to generate output audio data, depending on the situation.

The skill 1290 associated with the highest post-NLU ranker score may provide the post-NLU ranker 1565 with result data 1530 indicating more information is needed as well as instruction data. The instruction data may indicate how the skill 1290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device 110. When this occurs, the post-NLU ranker 1565 may simply cause the received instruction data be output by the device 110. Alternatively, the instruction data may be in a format that is not capable of being output by the device 110. When this occurs, the post-NLU ranker 1565 may cause the ASR component 1250 or the TTS component 1280 to process the instruction data, depending on the situation, to generate instruction data that may be output by the device 110. Once the user provides the system with all further information needed by the skill 1290, the skill 1290 may provide the system with result data 1530 indicating a response to the user input, which may be output by the system as detailed above.

The system may include "informational" skills 1290 that simply provide the system with information, which the system outputs to the user. The system may also include "transactional" skills 1290 that require a system instruction to execute the user input. Transactional skills 1290 include ride sharing skills, flight booking skills, etc. A transactional skill 1290 may simply provide the post-NLU ranker 1565 with result data 1530 indicating the transactional skill 1290 can execute the user input. The post-NLU ranker 1565 may then cause the system to solicit the user for an indication that the system is permitted to cause the transactional skill 1290 to execute the user input. The user-provided indication may be an audible indication or a tactile indication (e.g., activation of a virtual button or input of text via a virtual keyboard). In response to receiving the user-provided indication, the system may provide the transactional skill 1290 with data corresponding to the indication. In response, the transactional skill 1290 may execute the command (e.g., book a flight, book a train ticket, etc.). Thus, while the system may not further engage an informational skill 1290 after the informational skill 1290 provides the post-NLU ranker 1565 with result data 1530, the system may further engage a transactional skill 1290 after the transactional skill 1290 provides the post-NLU ranker 1565 with result data 1530 indicating the transactional skill 1290 may execute the user input.

In some instances, the post-NLU ranker 1565 may generate respective scores for first and second skills that are too close (e.g., are not different by at least a threshold difference) for the post-NLU ranker 1565 to make a confident determination regarding which skill should execute the user input. When this occurs, the system may request the user indicate which skill the user prefers to execute the user input. The system may output TTS-generated speech to the user to solicit which skill the user wants to execute the user input.

Figure 16:
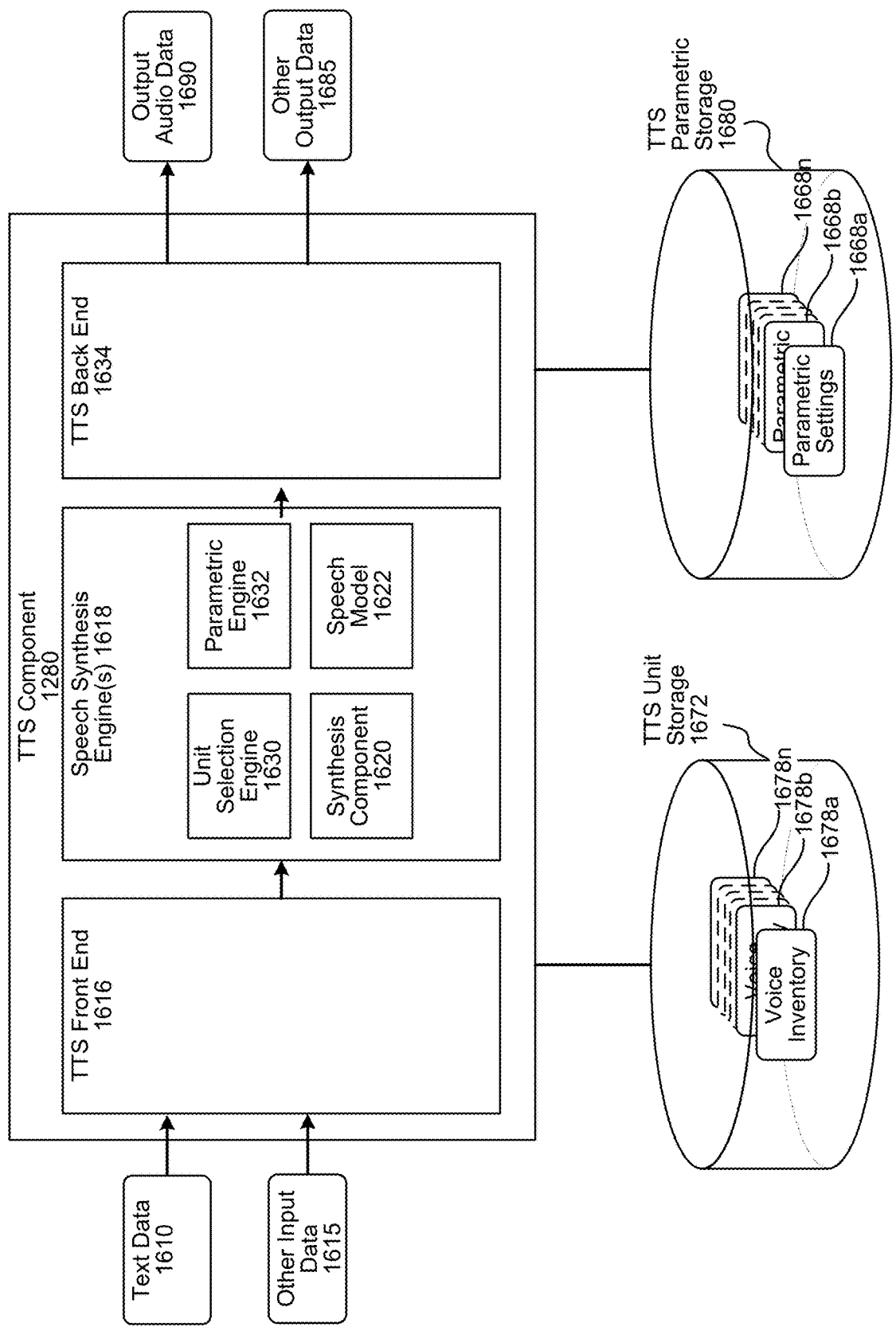
FIG. 16 is a conceptual diagram of text-to-speech components according to embodiments of the present disclosure.

Components of a system that may be used to perform unit selection, parametric TTS processing, and/or model-based audio synthesis are shown in FIG. 16. As shown in FIG. 16, the TTS component 1280 may include a TTS front end 1616, a speech synthesis engine 1618, TTS unit storage 1672, TTS parametric storage 1680, and a TTS back end 1634. The TTS unit storage 1672 may include, among other things, voice inventories 1678a-1678n that may include pre-recorded audio segments (called units) to be used by the unit selection engine 1630 when performing unit selection synthesis as described below. The TTS parametric storage 1680 may include, among other things, parametric settings 1668a-1668n that may be used by the parametric synthesis engine 1632 when performing parametric synthesis as described below. A particular set of parametric settings 1668 may correspond to a particular voice profile (e.g., whispered speech, excited speech, etc.).

In various embodiments of the present disclosure, model-based synthesis of audio data may be performed using by a speech model 1622 and a TTS front end 1616. The TTS front end 1616 may be the same as front ends used in traditional unit selection or parametric systems. In other embodiments, some or all of the components of the TTS front end 1616 are based on other trained models. The present disclosure is not, however, limited to any particular type of TTS front end 1616. The speech model 1622 may be used to synthesize speech without requiring the TTS unit storage 1672 or the TTS parametric storage 1680, as described in greater detail below.

TTS component receives text data 1610. Although the text data 1610 in FIG. 16 is input into the TTS component 1280, it may be output by other component(s) (such as a skill 1290, NLU component 1260, NLG component 1279 or other component) and may be intended for output by the system. Thus in certain instances text data 1610 may be referred to as "output text data." Further, the data 1610 may not necessarily be text, but may include other data (such as symbols, code, other data, etc.) that may reference text (such as an indicator of a word) that is to be synthesized. Thus data 1610 may come in a variety of forms. The TTS front end 1616 transforms the data 1610 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1618. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1610, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1616 may also process other input data 1615, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1610 and/or the text for a TTS request may be accompanied by separate metadata indicating what text should be whispered (or have some other indicated audio characteristic). The speech synthesis engine 1618 may compare the annotated phonetic units models and information stored in the TTS unit storage 1672 and/or TTS parametric storage 1680 for converting the input text into speech. The TTS front end 1616 and speech synthesis engine 1618 may include their own controller(s)/processor(s) and memory or they may use the controller/processor and memory of the server 120, device 110, or other device, for example. Similarly, the instructions for operating the TTS front end 1616 and speech synthesis engine 1618 may be located within the TTS component 1280, within the memory and/or storage of the server 120, device 110, or within an external device.

Text data 1610 input into the TTS component 1280 may be sent to the TTS front end 1616 for processing. The front end 1616 may include components for performing text normalization, linguistic analysis, linguistic prosody generation, or other such components. During text normalization, the TTS front end 1616 may first process the text input and generate standard text, converting such things as numbers, abbreviations (such as Apt., St., etc.), symbols ($, %, etc.) into the equivalent of written out words.

During linguistic analysis, the TTS front end 1616 may analyze the language in the normalized text to generate a sequence of phonetic units corresponding to the input text.

This process may be referred to as grapheme-to-phoneme conversion. Phonetic units include symbolic representations of sound units to be eventually combined and output by the system as speech. Various sound units may be used for dividing text for purposes of speech synthesis. The TTS component 1280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1672. The linguistic analysis performed by the TTS front end 1616 may also identify different grammatical components such as prefixes, suffixes, phrases, punctuation, syntactic boundaries, or the like. Such grammatical components may be used by the TTS component 1280 to craft a natural-sounding audio waveform output. The language dictionary may also include letter-to-sound rules and other tools that may be used to pronounce previously unidentified words or letter combinations that may be encountered by the TTS component 1280. Generally, the more information included in the language dictionary, the higher quality the speech output.

Based on the linguistic analysis the TTS front end 1616 may then perform linguistic prosody generation where the phonetic units are annotated with desired prosodic characteristics, also called acoustic features, which indicate how the desired phonetic units are to be pronounced in the eventual output speech. During this stage the TTS front end 1616 may consider and incorporate any prosodic annotations that accompanied the text input to the TTS component 1280. Such acoustic features may include syllable-level features, word-level features, emotion, speaker, accent, language, pitch, energy, duration, and the like. Application of acoustic features may be based on prosodic models available to the TTS component 1280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1616, which may be referred to as a symbolic linguistic representation, may include a sequence of phonetic units annotated with prosodic characteristics. This symbolic linguistic representation may be sent to the speech synthesis engine 1618, which may also be known as a synthesizer, for conversion into an audio waveform of speech for output to an audio output device and eventually to a user. The speech synthesis engine 1618 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1618 may perform speech synthesis using one or more different methods. In one method of synthesis called unit selection, described further below, a unit selection engine 1630 matches the symbolic linguistic representation created by the TTS front end 1616 against a database of recorded speech, such as a database (e.g., TTS unit storage 1672) storing information regarding one or more voice corpuses (e.g., voice inventories 1678a-n). Each voice inventory may correspond to various segments of audio that was recorded by a speaking human, such as a voice actor, where the segments are stored in an individual inventory 1678 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short.wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1630 may then use the information about each unit to select units to be joined together to form the speech output.

The unit selection engine 1630 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1620) to form output audio data 1690 representing synthesized speech. Using all the information in the unit database, a unit selection engine 1630 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1632, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1620) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 1280 may be configured to perform TTS processing in multiple languages. For each language, the TTS component 1280 may include specially configured data, instructions and/or components to synthesize speech in the desired language(s). To improve performance, the TTS component 1280 may revise/update the contents of the TTS unit storage 1672 based on feedback of the results of TTS processing, thus enabling the TTS component 1280 to improve speech synthesis.

The TTS unit storage 1672 may be customized for an individual user based on his/her individualized desired speech output. In particular, the speech unit stored in a unit database may be taken from input audio data of the user speaking. For example, to create the customized speech output of the system, the system may be configured with multiple voice inventories 1678a-1678n, where each unit database is configured with a different "voice" to match desired speech qualities. Such voice inventories may also be linked to user accounts. The voice selected by the TTS component 1280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1678 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1668) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1630 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1630. As part of unit selection, the unit selection engine 1630 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1672 or in another storage component. For example, different unit selection databases may be stored in TTS unit storage 1672. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1618 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 1280 may include an acoustic model, or other models, which may convert a symbolic linguistic representation into a synthetic acoustic waveform of the text input based on audio signal manipulation. The acoustic model includes rules which may be used by the parametric synthesis engine 1632 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1616.

The parametric synthesis engine 1632 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1618, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1632 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1632 may lead to a number of potential audio output sequences. Based on the acoustic model and other potential models, the potential audio output sequences may be scored according to a confidence level of the parametric synthesis engine 1632. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1668, which may represent acoustic settings matching a particular parametric "voice", may be used by the synthesis component 1620 to ultimately create the output audio data 1690.

When performing unit selection, after a unit is selected by the unit selection engine 1630, the audio data corresponding to the unit may be passed to the synthesis component 1620. The synthesis component 1620 may then process the audio data of the unit to create modified audio data where the modified audio data reflects a desired audio quality. The synthesis component 1620 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 1280. For each unit that corresponds to the selected portion, the synthesis component 1620 may process the audio data for that unit to create a modified unit audio data. The modified unit audio data may then be concatenated to form the output audio data 1690. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 1280. In that case, other output data 1685 may be output along with the output audio data 1690 so that an ultimate playback device (e.g., device 110) receives instructions for playback that can assist in creating the desired output audio. Thus, the other output data 1685 may include instructions or other data indicating playback device settings (such as volume, playback rate, etc.) or other data indicating how output audio data including synthesized speech should be output. For example, for whispered speech, the output audio data 1690 may include other output data 1685 that may include a prosody tag or other indicator that instructs the device 110 to slow down the playback of the output audio data 1690, thus making the ultimate audio sound more like whispered speech, which is typically slower than normal speech. In another example, the other output data 1685 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 17 is a block diagram conceptually illustrating a device 110 that may be used with the system. FIG. 18 is a block diagram conceptually illustrating example components of a system, such as the centralized system 120, which may assist with ASR processing, NLU processing, etc., and a skill support system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/120/125) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1702/1802).

Computer instructions for operating each device (110/120/125) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/120/125) includes input/output device interfaces (1702/1802). A variety of components may be connected through the input/output device interfaces (1702/1802), as will be discussed further below. Additionally, each device (110/120/125) may include an address/data bus (1724/1824) for conveying data among components of the respective device. Each component within a device (110/120/125) may also be directly connected to other components in addition to (or instead of) being connected to other components across the bus (1724/1824).

Referring to FIG. 17, the device 110 may include input/output device interfaces 1702 that connect to a variety of components such as an audio output component such as a speaker 1712, a wired headset or a wireless headset (not illustrated), or other component capable of outputting audio. The device 110 may also include an audio capture component. The audio capture component may be, for example, a microphone 1720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1716 for displaying content. The device 110 may further include a camera 1718.

Via antenna(s) 1722, the input/output device interfaces 1702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1702/1802) may also include communication components that allow data to be exchanged between devices such as different physical servers in a collection of servers or other components.

The components of the device(s) 110, the natural language command processing system 120, or a skill support system 125 may include their own dedicated processors, memory, and/or storage. Alternatively, one or more of the components of the device(s) 110, the natural language command processing system 120, or a skill support system 125 may utilize the I/O interfaces (1702/1802), processor(s) (1704/1804), memory (1706/1806), and/or storage (1708/1808) of the device(s) 110, natural language command processing system 120, or the skill support system 125, respectively. Thus, the ASR component 1250 may have its own I/O interface(s), processor(s), memory, and/or storage; the NLU component 1260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill support system 125, as described herein, are illustrative, and may be located as a stand-alone device or may be included, in whole or in part, as a component of a larger device or system.

As illustrated in FIG. 19, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1250, the NLU component 1260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   training first parameters for a first speech processing model using a first dataset;
   sending the first speech processing model to a remote device;
   determining a second dataset, wherein the second dataset includes at least a portion of the first dataset;
   determining a size constraint for a model update object, wherein the size constraint is determined such that processing the first speech processing model using the model update object generates a second speech processing model that achieves a desired accuracy;
   using the size constraint, the first speech processing model, and the second dataset to train the model update object to include first values, wherein processing the first parameters using the first values generates second parameters for the second speech processing model;
   sending the model update object to the remote device; and
   causing the remote device to generate the second speech processing model using the first speech processing model and the model update object.

2. The computer-implemented method of claim 1, wherein training the model update object comprises:
   performing first training of the model update object using the first speech processing model and the second dataset to determine second values for the model update object;
   determining a first subset of the second values to replace with first null values;
   performing second training of the model update object using the first speech processing model and the second dataset to determine third values for the model update object, wherein the first null values are unchanged during the second training;
   determining a second subset of the third values to replace with second null values, wherein the second subset is a superset of the first subset and larger than the first subset; and
   performing third training of the model update object using the first speech processing model and the second dataset to determine the first values for the model update object, wherein the second null values are unchanged during the third training.

3. The computer-implemented method of claim 1, further comprising:
   determining at least one predetermined function, wherein processing the first speech processing model using the model update object and the at least one predetermined function generates the second speech processing model, and wherein causing the remote device to generate the second speech processing model includes:

causing the remote device to process first values of the model update object using the at least one predetermined function to generate second values, and wherein the second values include a greater number of values than the first values, and causing the remote device to process the first parameters and the second values to generate the second parameters.

4. The computer-implemented method of claim 1, further comprising:

using the first speech processing model and the second dataset to determine a set of input-output pairs, wherein processing the first speech processing model using the set of input-output pairs generates the second speech processing model, wherein the model update object includes the set of input-output pairs; and causing the remote device to process the first speech processing model using the set of input-output pairs to generate the second speech processing model.

5. A computer-implemented method comprising:

determining a first machine learning model using a first dataset;

receiving a second dataset;

determining a size constraint for a model update object;

using the size constraint, the first machine learning model, and the second dataset to train the model update object, wherein processing the first machine learning model using the model update object generates a second machine learning model;

sending the model update object to a device; and causing the device to generate the second machine learning model using the first machine learning model and the model update object.

6. The computer-implemented method of claim 5, wherein training the model update object comprises:

performing first training of the model update object using the first machine learning model and the second dataset to determine first values for the model update object;

determining a first subset of the first values to replace with first null values;

performing second training of the model update object using the first machine learning model and the second dataset to determine second values for the model update object, wherein the first null values are unchanged during the second training; and determining the model update object using the second values.

7. The computer-implemented method of claim 6, further comprising:

determining a second subset of the second values to replace with second null values, wherein the second subset larger than the first subset; and performing third training of the model update object using the first machine learning model and the second dataset to determine third values for the model update object, wherein the second null values are unchanged during the third training, and wherein the model update object includes the third values.

8. The computer-implemented method of claim 6, further comprising:

determining the first subset of the first values based at least on the size constraint, wherein the first values represent a sparse matrix.

9. The computer-implemented method of claim 5, further comprising:

determining first one or more predetermined functions, wherein causing the device to generate the second machine learning model includes:

causing the device to process the model update object using the first one or more predetermined functions to generate a plurality of values, and causing the device to process the first machine learning model and the plurality of values to generate the second machine learning model.

10. The computer-implemented method of claim 9, further comprising:

receiving a third dataset;

determining second one or more predetermined functions different from the first one or more predetermined functions;

determining a second model update object using the second machine learning model and the third dataset; and causing the device to process the second machine learning model using the second model update object and the second one or more predetermined functions to generate a third machine learning model.

11. The computer-implemented method of claim 5, further comprising:

using the first machine learning model and the second dataset to determine a set of input-output pairs, wherein processing the first machine learning model using the set of input-output pairs generates the second machine learning model, and the model update object includes the set of input-output pairs; and causing the device to process the first machine learning model using the set of input-output pairs to generate the second machine learning model.

12. The computer-implemented method of claim 5, wherein the first machine learning model and the second machine learning model are used by a speech processing system to process spoken commands.

13. A system, comprising:

at least one processor; and at least one memory comprising instructions that, when executed by the at least one processor, cause the system to:

determine a first machine learning model using a first dataset;

receive a second dataset;

determine a size constraint for a model update object;

using the size constraint, the first machine learning model, and the second dataset to train the model update object, wherein processing the first machine learning model using the model update object generates a second machine learning model;

send the model update object to a device; and cause the device to generate the second machine learning model using the first machine learning model and the model update object.

14. The system of claim 13, wherein the at least one memory further comprises instructions that, when executed by the at least one processor, further cause the system to:

perform first training of the model update object using the first machine learning model and the second dataset to determine first values for the model update object;

determine a first subset of the first values to replace with first null values;

performing second training of the model update object using the first machine learning model and the second dataset to determine second values for the model update object, wherein the first null values are unchanged during the second training; and determine the model update object using the second values.

15. The system of claim 14, wherein the at least one memory further comprises instructions that, when executed by the at least one processor, further cause the system to:

determine a second subset of the second values to replace with second null values, wherein the second subset larger than the first subset; and perform third training of the model update object using the first machine learning model and the second dataset to determine third values for the model update object, wherein the second null values are unchanged during the third training, and wherein the model update object includes the third values.

16. The system of claim 14, wherein the at least one memory further comprises instructions that, when executed by the at least one processor, further cause the system to:

determine the first subset of the first values based at least on the size constraint, wherein the first values represent a sparse matrix.

17. The system of claim 13, wherein the at least one memory further comprises instructions that, when executed by the at least one processor, further cause the system to:

determine first one or more predetermined functions, wherein instructions further cause the system to:

cause the device to process the model update object using the first one or more predetermined functions to generate a plurality of values, and cause the device to process the first machine learning model and the plurality of values to generate the second machine learning model.

18. The system of claim 17, wherein the at least one memory further comprises instructions that, when executed by the at least one processor, further cause the system to:

receive a third dataset;

determine second one or more predetermined functions different from the first one or more predetermined functions;

determine a second model update object using the second machine learning model and the third dataset; and cause the device to process the second machine learning model using the second model update object and the second one or more predetermined functions to generate a third machine learning model.

19. The system of claim 13, wherein the at least one memory further comprises instructions that, when executed by the at least one processor, further cause the system to:

use the first machine learning model and the second dataset to determine a set of input-output pairs, wherein processing the first machine learning model using the set of input-output pairs generates the second machine learning model, and the model update object includes the set of input-output pairs; and cause the device to process the first machine learning model using the set of input-output pairs to generate the second machine learning model.

20. The system of claim 13, wherein the first machine learning model and the second machine learning model are used by a speech processing system to process spoken commands.

* * * * *